United States Patent
Xia

(10) Patent No.: US 11,265,993 B2
(45) Date of Patent: Mar. 1, 2022

(54) METHOD, DEVICE AND SYSTEM FOR CONTROLLING PARTITION LIGHTING OF CONFERENCE ROOM BASED ON WIRELESS NETWORKING TECHNOLOGY

(71) Applicants: OPPLE LIGHTING CO., LTD., Shanghai (CN); SUZHOU OPPLE LIGHTING CO., LTD., Suzhou (CN)

(72) Inventor: Jianming Xia, Shanghai (CN)

(73) Assignees: Opple Lighting Co., Ltd., Shanghai (CN); Suzhou Opple Lighting Co., Ltd., Suzhou (CN)

(*) Notice: Subject to any disclaimer, the term of this patent is extended or adjusted under 35 U.S.C. 154(b) by 0 days.

(21) Appl. No.: 16/854,521

(22) Filed: Apr. 21, 2020

(65) Prior Publication Data

US 2020/0253030 A1   Aug. 6, 2020

Related U.S. Application Data

(63) Continuation of application No. PCT/CN2018/110505, filed on Oct. 16, 2018.

(30) Foreign Application Priority Data

Oct. 24, 2017  (CN) .................. 201711001872.X
Oct. 24, 2017  (CN) .................. 201721377247.0

(51) Int. Cl.
*H05B 47/11*   (2020.01)
*H05B 47/19*   (2020.01)
(Continued)

(52) U.S. Cl.
CPC ............. *H05B 47/11* (2020.01); *H05B 47/16* (2020.01); *H05B 47/165* (2020.01); *H05B 47/19* (2020.01); *H05B 47/17* (2020.01)

(58) Field of Classification Search
CPC ........ H05B 47/11; H05B 47/16; H05B 47/17; H05B 47/19; H05B 47/165; Y02B 20/40; H04W 84/14
See application file for complete search history.

(56) References Cited

U.S. PATENT DOCUMENTS

2008/0223924 A1* 9/2008 Riahi .................. H05B 47/115
                                                           235/380
2014/0354187 A1* 12/2014 Aggarwal ............. H05B 47/19
                                                           315/312
(Continued)

FOREIGN PATENT DOCUMENTS

CN      101163366 A    4/2008
CN      205051910 U    2/2016
(Continued)

OTHER PUBLICATIONS

Machine Translation of CN 106231754A. (Year: 2016).*
(Continued)

*Primary Examiner* — Alexander H Taningco
*Assistant Examiner* — Pedro C Fernandez
(74) *Attorney, Agent, or Firm* — Arch & Lake LLP

(57) ABSTRACT

The disclosure provides a method, a device and a system for controlling partition lighting of a conference room based on a wireless networking technology. The lighting equipment is divided into at least one group according to the area, and each group of lighting equipment has an independent lighting equipment group number. The method includes: presetting at least one working mode and a corresponding lighting equipment group number, generating and storing at the control panel a worksheet, querying the worksheet, and obtaining a lighting equipment group number, broadcasting a wireless control command carrying the lighting equipment (Continued)

group number, and performing a corresponding operation according to the wireless control command.

19 Claims, 12 Drawing Sheets

(51) Int. Cl.
 *H05B 47/16* (2020.01)
 *H05B 47/165* (2020.01)
 *H05B 47/17* (2020.01)

(56) References Cited

U.S. PATENT DOCUMENTS

2015/0042240 A1* 2/2015 Aggarwal ............ H05B 47/175
 315/292
2016/0242264 A1* 8/2016 Pakkala ................. H05B 47/19
2016/0322817 A1* 11/2016 Baker .................... G05B 15/02
2017/0142810 A1* 5/2017 Cho ........................ H04W 4/80

FOREIGN PATENT DOCUMENTS

| | | |
|---|---|---|
| CN | 105848330 A | 8/2016 |
| CN | 106231754 A | 12/2016 |
| CN | 107743332 A | 2/2018 |
| EP | 3053414 A1 | 8/2016 |

OTHER PUBLICATIONS

International Search Report (including English translation) and Written Opinion issued in PCT/CN2018/110505, dated Aug. 1, 2018, 9 pages.

* cited by examiner

| Conference room number | Working group number | Description of multiplex |
|---|---|---|
| 1 | 0x1 | Report mode |
| 2 | 0x2 | Discussion mode |
| 3 | 0x3 | Cleaning mode |
| 1-2 | 0x11 | Combine two of them |
| 1-3 | 0x12 | Combine two of them |
| 2-3 | 0x13 | Combine two of them |
| 1-2-3 | 0x21 | Combine all of them |

METHOD, DEVICE AND SYSTEM FOR CONTROLLING PARTITION LIGHTING OF CONFERENCE ROOM BASED ON WIRELESS NETWORKING TECHNOLOGY

CROSS-REFERENCE TO RELATED APPLICATIONS

This application is based upon and claims the priority of PCT patent application No. PCT/CN2018/110505 filed on Oct. 16, 2018 which claims the priority of Chinese Patent Application No. 201711001872.X filed on Oct. 24, 2017 and Chinese Patent Application No. 201721377247.0 filed on Oct. 24, 2017, the entire content of all of which is hereby incorporated by reference herein for all purposes.

TECHNICAL FIELD

The present disclosure relates to the technical field of lighting control, and more particularly, to a method, a device, and a system for controlling partition lighting of a conference room based on a wireless networking technology.

BACKGROUND

The pace of people's work and life is constantly accelerating, and the lighting of conference rooms has become one of the main factors that directly affect the efficiency of conferences, and has attracted more and more attention.

SUMMARY

The present disclosure provides a method, and a device for controlling conference room partition lighting based on a wireless networking technology.

According to one aspect of the disclosure, a method is provided for controlling partition lighting of a conference room based on a wireless networking technology. The method may include controlling, by a control panel, a working state of lighting equipment in the conference room, wherein: the lighting equipment in the conference room is divided into at least one group according to areas, each group of lighting equipment has an independent lighting equipment group number, the control panel and the lighting equipment are provided with wireless control modules, and a wireless ad hoc network is established between the wireless control modules.

The method may also include presetting, by the control panel, at least one working mode and a corresponding lighting equipment group number, and generating and storing at the control panel a worksheet in which the working mode has a one-to-one correspondence with the lighting equipment group number; querying, by the control panel, the worksheet stored at the control panel according to lighting requirements of a user to determine a lighting equipment that the user requires to be enabled, and obtaining a lighting equipment group number corresponding to the lighting equipment required to be enabled; and broadcasting, by the control panel, a wireless control command carrying the lighting equipment group number corresponding to the lighting equipment required to be enabled to the lighting equipment through the wireless ad hoc network between the wireless control modules, receiving and forwarding, by the lighting equipment, the wireless control command, and performing a corresponding operation according to the wireless control command.

According to another aspect of the present disclosure, a device is provided for controlling partition lighting of a conference room based on a wireless networking technology. The device may be applied to a control panel which controls a working state of lighting equipment in the conference room, the lighting equipment in the conference room may be divided into at least one group according to area, each group of lighting equipment may have an independent lighting equipment group number, the control panel and the lighting equipment may be provided with wireless control modules, and a wireless ad hoc network may be established between the wireless control modules.

The device may include: a mode presetting module, configured to preset, by the control panel, at least one working mode and a corresponding lighting equipment group number, and generate and store at the control panel a worksheet in which the working mode has a one-to-one correspondence with the lighting equipment group number; a selection obtaining module, configured to query, by the control panel, the worksheet stored at the control panel according to a lighting requirement of a user to determine a lighting equipment that the user requires to be enabled, and obtain a lighting equipment group number corresponding to the lighting equipment required to be enabled; and a first wireless control module, configured to broadcast, by the control panel, a wireless control command carrying the lighting equipment group number corresponding to the lighting equipment required to be enabled to the lighting equipment through the wireless ad hoc network between the wireless control modules, receive and forward, by the lighting equipment, the wireless control command, and perform a corresponding operation according to the wireless control command.

According to a further aspect of the present disclosure, a device is provided for controlling partition lighting of a conference room based on a wireless networking technology. The device may be applied to a lighting equipment which receives and forwards control signals of a control panel, the control panel and the lighting equipment may be provided with wireless control modules, and a wireless ad hoc network may be established between the wireless control modules.

The device may include a second wireless control module, configured to receive, by the lighting equipment, a wireless control command broadcast by the control panel through the wireless ad hoc network between the wireless control modules; a determining module, configured to obtain, by the lighting equipment and according to the wireless control command, a lighting equipment group number corresponding to the lighting equipment required to be enabled which is carried in the wireless control command; and a response module, configured to determine, by the lighting equipment, whether itself needs to respond to the wireless control command according to the lighting equipment group number corresponding to the lighting equipment required to be enabled, if so, perform and forward by the lighting equipment the wireless control command, and if not, forward by the lighting equipment the wireless control command.

It is to be understood that both the foregoing general description and the following detailed description are exemplary and explanatory only and are not restrictive of the present disclosure.

BRIEF DESCRIPTION OF THE DRAWINGS

Various other advantages and benefits will become apparent to those of ordinary skills in the art upon reading the detailed description of the examples below. The drawings are only for the purpose of illustrating examples and are not to be considered as limiting the disclosure. Moreover, the same reference numerals are used throughout the drawings to refer to the same parts. In the drawings.

DETAILED DESCRIPTION

Figure 1:
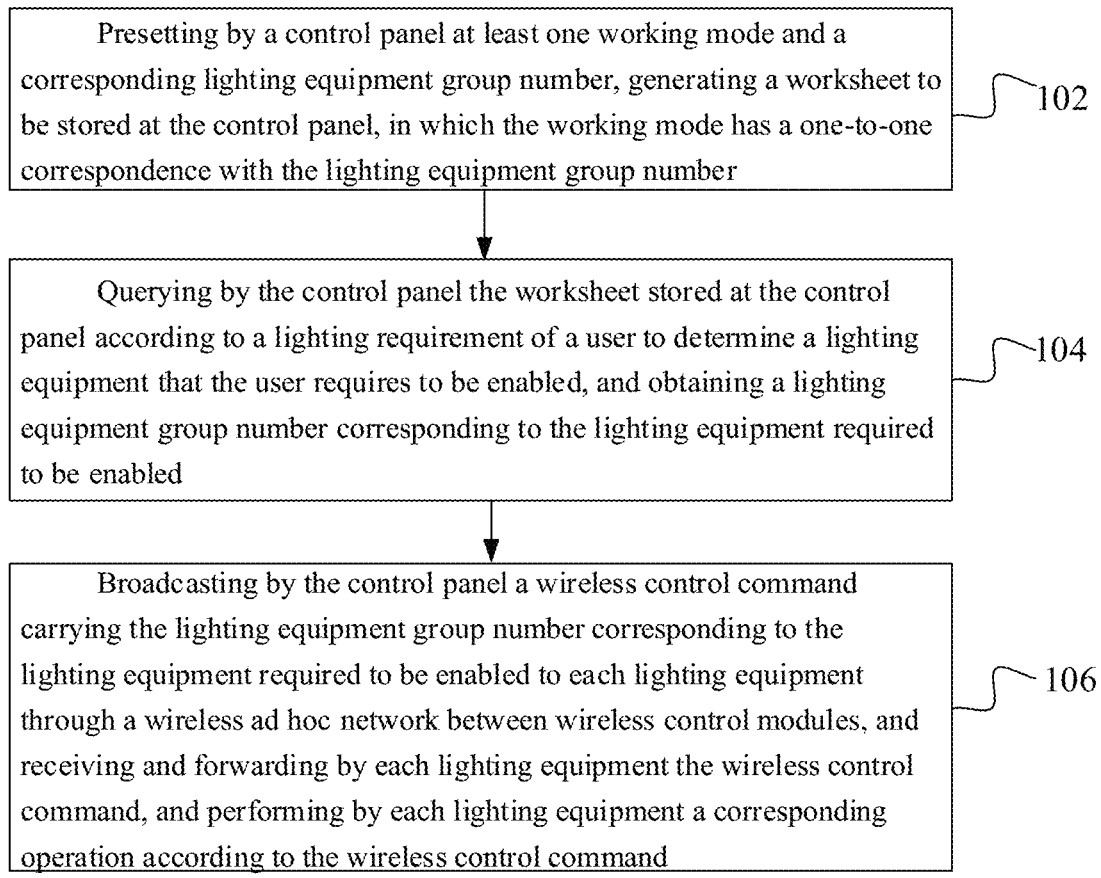
FIG. 1 is a schematic flowchart of a method for controlling partition lighting of a conference room based on a wireless networking technology according to an example of the present disclosure.

Hereinafter, examples of the present disclosure will be described in more detail with reference to the accompanying drawings. Although examples of the present disclosure are illustrated in the drawings, it could be understood that the present disclosure can be implemented in various forms and should not be limited by the examples set forth herein. On the contrary, these examples are provided to enable a thorough understanding of the present disclosure, and to fully convey the scope of the present disclosure to those skilled in the art.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Unlike in the regular office area, which requires a stable and continuous visual environment, the conference room mode in the office has the characteristics of variable working time and variable space sizes. In this way, when using the lighting of the conference room, users need to quickly enter the corresponding scene lighting environment according to the change of the conference space.

However, sometimes, there are many kinds of equipment in the conference room, and there is more lighting equipment for different purposes. In the design of the conference room lighting, there are two design schemes: one is that there are many equipment and corresponding control switches in the conference room, so there are many physical hardware circuits, which makes the field control need to be tested multiple times; the other is that the large area control method is directly adopted, that is, the lighting circuit is controlled by the building's automatic control room, and there is no switch at the scene, so the lighting state cannot be adjusted according to the actual situation, which is inconvenient to use. Thus, both of the above schemes increase the difficulty of managing the conference room.

Secondly, in order to make full use of space and efficiency, sometimes, screens can be used to switch large and small conference areas during the conference interval according to the size of the conference, but the re-switching of the corresponding lighting system can be complicated. For example, the audience area may become a lectern area, the lighting requirements of which are different, and the lighting function is simply set and cannot be adjusted to a suitable lighting environment according to the actual situation. Furthermore, once the decoration is deployed, the basic functions of the conference room lighting have been fixed, and then it is difficult to create different lighting scenes, lighting layouts, lighting times, control methods, and the like according to the content of the conference. Therefore, the conference room lighting sometimes cannot meet the actual requirements of users.

In general, there are often many equipment that requires to be controlled in conference rooms. For example, the lighting equipment of a conference room includes general lights, stage spotlights, projection lights, and the like. In addition, other conference equipment includes curtains, air conditioners, screens, projectors and so on. Furthermore, the larger the conference room, the more equipment it contains, and the more equipment in the conference room, the more switches are required. In this way, people may have a lot of troubles in the application and management of the conference room. For example, professional equipment testing personnel are required to test the lights and other equipment in the conference room before each conference, which consumes a lot of manpower and material resources, and wastes a lot of time of the user, causing inconvenience to the user. In addition, the related equipment in the conference room may frequently encounter various unexpected situations during the conference. In this case, it needs to be repaired and tested by professionals again, which cannot guarantee the normal progress of the conference and affect the user experience.

In order to solve the above technical problems, an example of the present disclosure provides a method for controlling partition lighting of a conference room based on a wireless networking technology. FIG. 1 is a schematic flowchart illustrating a method for controlling partition lighting of a conference room based on a wireless networking technology according to an example of the present disclosure. As illustrated in FIG. 1, the method includes at least steps S102 to S106 (or represented by steps A to C):

Step S102: presetting by a control panel at least one working mode and a corresponding lighting equipment group number, generating a worksheet to be stored at the control panel, in which the working mode has a one-to-one correspondence with the lighting equipment group number;

Step S104: querying by the control panel the worksheet stored at the control panel according to a lighting requirement of a user to determine a lighting equipment that the user requires to be enabled, and obtaining a lighting equipment group number corresponding to the lighting equipment required to be enabled;

Step S106: broadcasting by the control panel a wireless control command carrying the lighting equipment group number corresponding to the lighting equipment required to be enabled to each lighting equipment through a wireless ad hoc network between wireless control modules, and receiving and forwarding by each lighting equipment the wireless control command, and performing by each lighting equipment a corresponding operation according to the wireless control command.

According to the method for controlling partition lighting of the conference room based on the wireless networking technology of the present disclosure, firstly, the lighting equipment in the conference room are divided into at least one group according to the area, and each group of lighting equipment has an independent lighting equipment group number. In addition, the wireless control modules are provided in the control panel and the lighting equipment, and the wireless ad hoc network can be established between the wireless control modules. The control panel can control the lighting equipment in the conference room through the established wireless ad hoc network. More specifically, the control panel can also preset at least one working modes and the corresponding lighting equipment group numbers, and generate the worksheet in which the working modes have a one-to-one correspondence with the lighting equipment group numbers to be stored at the control panel. Furthermore, the control panel queries the worksheet stored at the control panel according to the lighting requirement of the user and the current working mode to determine the lighting equipment that the user requires to be enabled, and obtains the lighting equipment group number corresponding to the lighting equipment; Accordingly, the control panel broadcasts the wireless control command to each lighting equipment through the wireless ad hoc network between the wireless control modules, and each lighting equipment receives and forwards the wireless control command carrying the lighting equipment group number corresponding to the lighting equipment required to be enabled, and performs the corresponding operation according to the wireless control command.

It can be known that, the method of the example of the present disclosure uses the control panel to control the lighting equipment of the conference room through the wireless ad hoc network between the modules. This method does not need to configure multiple switches for multiple devices and does not need to establish complex hardware circuits, and the user can adjust the switch, brightness, color temperature, etc. of the lighting equipment of the conference room at any position in the conference room only through the control panel, which is convenient for the user. In addition, this method can establish a connection with the network through a wireless networking technology, which is powerful and widely used. In addition, each lighting equipment group can also be arbitrarily configured and combined, thereby realizing the custom configuration and interchange of the system in a real sense, and intelligently realizing the separation and combination of lighting in several conference room space areas. In addition, the present disclosure can also simply and quickly set different lighting scenes for different conference areas through the control panel according to the requirements of users to adapt to different lighting effects of different conference states, and independent control of each conference area can improve the efficiency of the use of the conference room while reducing the management work of conference room lighting switching, which improves the user experience.

In the example of the present disclosure, all the lighting equipment and the corresponding control panels in the conference room are provided with wireless control modules, and all the provided wireless control modules have a wireless transceiver function to transmit, receive, and analyze wireless control commands, and then perform corresponding operations according to the analysis results. In addition, in the example of the present disclosure, the wireless ad hoc network can also be established through the wireless control module between the control panel and the lighting equipment. Wireless networking mentioned in this example refers to the wireless ad hoc network constructed by each wireless control module between the control panel and the lighting equipment.

The wireless ad hoc network, developed on the basis of a wireless packet network, is a temporary multi-hop autonomous system composed of a group of mobile nodes with wireless transceivers, which does not rely on preset infrastructure, and has the characteristics of temporary networking, rapid deployment, no control center, strong anti-destruction, etc., so it has a broad application prospect in military, and civil aspects. In the example of the present disclosure, the control commands and other commands are transmitted through the wireless ad hoc network established between the control panel and the lighting equipment, and each command can be broadcasted or relayed through any nearest lighting equipment node using the wireless ad hoc network technology. Therefore, in this example, the user can control the lighting equipment at any position and in any direction of the conference room through the control panel. There is no restriction on the use angle of the control panel in this example, which brings great convenience to the user.

Figure 2:
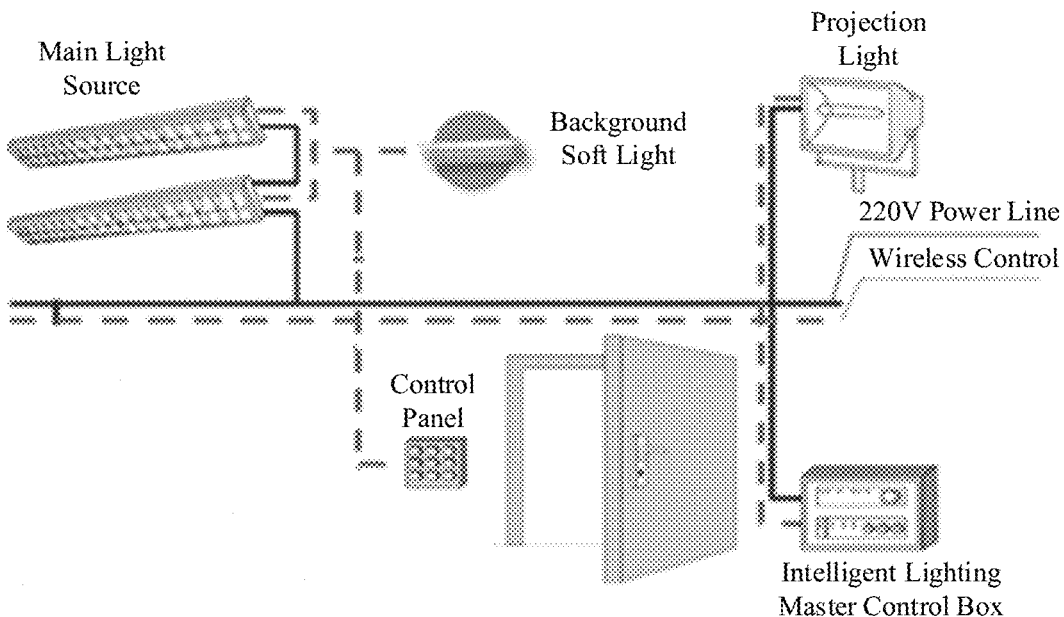
FIG. 2 is a topological diagram of a working scene of a conference room area according to an example of the present disclosure.

FIG. 2 is a topographic diagram illustrating a working scene of a conference room area according to an example of the present disclosure. As illustrated in FIG. 2, the equipment in the conference room area includes: a main light source, a background soft light, a projection light, a control panel, an intelligent lighting master control box, and the like. Among them, all the lighting equipment and control panel are basic components. Each of the components in the conference room area includes a wireless control module, and the wireless control module has a wireless transceiver function, and is also used for the control of wireless commands. All the lighting equipment are physically connected to the main controller (as illustrated by the solid line in FIG. 2) for power supply, and do not need the switches of the physical circuit in the switching process, but are controlled through the network between the wireless control modules (as illustrated by the dotted line in FIG. 2).

More specifically, in the example of the present disclosure, firstly, the lighting equipment in the conference room are divided into at least one group according to their installation positions or functional characteristics, and an independent lighting equipment group number is matched for each group of lighting equipment and stored locally in the lighting equipment. By grouping the lighting equipment in advance and matching the group number for each group of lighting equipment, the lighting equipment in the conference room can be more conveniently managed. In addition, in the example of the present disclosure, the wireless control modules are provided in the control panel and the lighting equipment, and the wireless ad hoc network is established between the wireless control modules to form a communication network. Furthermore, the control panel can control the lighting equipment in the conference room through the communication network.

Figures 3, 4:
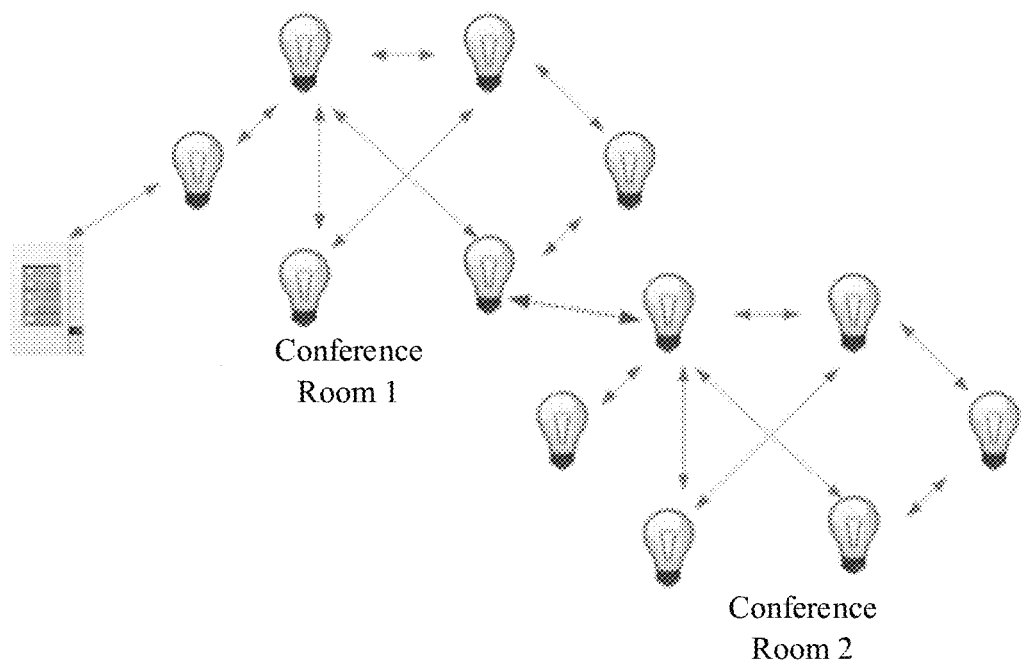
FIG. 3 is a schematic diagram of an example of a worksheet generated by group calculation of a conference room area in advance according to an example of the present disclosure.
FIG. 4 is a schematic diagram of a partition control of a conference room according to an example of the present disclosure.

According to the method of the present disclosure, step S102 may be first performed, the control panel presets at least one working mode and a corresponding lighting equipment group number, and generates a worksheet to be stored at the control panel, in which the working mode has a one-to-one correspondence with the lighting equipment group number. In the example of the present disclosure, FIG. 3 is taken as an example, and FIG. 3 is a schematic diagram illustrating an example of a worksheet generated by group calculation of a conference room area in advance according to an example of the present disclosure. Referring to FIG. 3, the preset working modes in this example may include a report mode, a discussion mode, and a cleaning mode, and may also include a new working mode obtained by combining multiple modes. The lighting equipment group number corresponding to the report mode is 1, the lighting equipment group number corresponding to the discussion mode is 2, and the lighting equipment group number corresponding to the cleaning mode is 3. In addition, according to the method of the present disclosure, more work modes can be preset, and a worksheet with more content and containing one-to-one correspondence between more work modes and lighting equipment group numbers can be generated. FIG. 3 is taken as an example in this example of the present disclosure, but it does not constitute a limitation on the working mode of the present disclosure. The working mode of the present disclosure may also include other types, which are not specifically limited in the example of the present disclosure.

In the example of the present disclosure, after step S102 is performed, a preset worksheet is stored at the control panel, and then step S104 is performed, the control panel queries the worksheet stored at the control panel according to the lighting requirement of the user and the current working mode to determine the lighting equipment that the user requires to be enabled, and obtains the lighting equipment group number corresponding to the lighting equipment required to be enabled.

More specifically, when determining the lighting equipment that the user requires to be enabled according to the lighting requirement of the user, the user's triggering can be received through the control panel, and when a control command triggered by the user is received, the locally stored working mode can be obtained from the lighting equipment currently controlled by the control panel. In an optional example, the lighting equipment currently controlled by the control panel may be a lighting equipment determined according to a control relationship between a control panel and a corresponding lighting equipment preset in the control panel, or may be a lighting equipment selected by the control panel according to the signal strength (or the distance range) that has the strongest signal strength (or is closest to the control panel) during the interaction between the lighting equipment and the control panel. In the example of the present disclosure, each lighting equipment stores the most recently received working mode. Further, in the example of the present disclosure, the control panel may query the worksheet stored at the control panel according to the working mode corresponding to the currently controlled lighting equipment, determine the lighting equipment that the user requires to be enabled according to the one-to-one correspondence between the working modes and the lighting equipment group numbers in the worksheet, and obtain the lighting equipment group number corresponding to the lighting equipment required to be enabled corresponding to the working mode locally stored in the currently controlled lighting equipment.

In an optional example, when determining the lighting equipment that the user requires to be enabled according to the lighting requirement of the user, it may also first determine whether the control panel has received a mode switching command triggered by the user, and if so, the control panel obtains the switched working mode selected by the user. After the switched working mode selected by the user is obtained, the switched working mode selected by the user may be updated and stored synchronously in the respective ad hoc network node in the conference room. More specifically, the control panel may broadcast the wireless control command carrying the switched working mode to each lighting equipment and each control panel in the conference room through the wireless ad hoc network between the wireless control modules. Further, each lighting equipment and each control panel receive and forward the wireless control command, and update the working mode locally stored in each lighting equipment and each control panel according to the wireless control command. In this case, the updated working mode is locally stored in each lighting equipment and each control panel, and if the control panel receives the control command triggered by the user, the most recently received switched working mode selected by the user can be obtained by the control panel from the local storage of each lighting equipment. In an optional example, the working mode updated and stored by the control panel can also be obtained directly from the control panel. Further, the control panel queries the worksheet stored on the control panel according to the obtained updated working mode (the switched working mode selected by the user) to determine the lighting equipment that the user requires to be enabled, and obtains the lighting equipment group number corresponding to the lighting equipment required to be enabled.

In the example of the present disclosure, there are multiple working modes in the conference room, and the user can also have multiple choices when switching modes. In this example, FIG. 4 is taken as an example, and FIG. 4 is a schematic diagram illustrating partition control of a conference room according to an example of the present disclosure. As illustrated in FIG. 4, the conference room is divided into two areas, namely a conference room 1 and a conference room 2. The lighting equipment group number corresponding to the conference room 1 is 1, and the lighting equipment group number corresponding to the conference room 2 is 2. The conference room 1 and the conference room 2 can exist independently. In this case, the lighting equipment 1 corresponding to the conference room 1 and the lighting equipment 2 corresponding to the conference room 2 work independently, and the conference room 1 and the conference room 2 correspond to different working modes respectively. The control panel can also independently control the two areas.

In addition, in the example of the present disclosure, the conference room 1 and the conference room 2 may also be merged. More specifically, when the conference room 1 and the conference room 2 work independently and are under the control of their respective groups, once a command for merging the lighting equipment group numbers is received, only the to-be-merged lighting equipment in the small conference rooms corresponding to the lighting equipment group number can perform the corresponding operation, and the small conference rooms are finally merged into a combined large conference room according to the received merging command. In this case, the lighting equipment 1 corresponding to the conference room 1 and the lighting equipment 2 corresponding to the conference room 2 work together to form a new working mode. The control panel can directly control the combined large conference room, that is, the control panel can directly control all the lighting equipment corresponding to the lighting equipment group numbers 1, 2. It can be seen that in this example, one-click control of the combined large conference mode can be performed directly through the control panel, which is convenient for users to control the conference room directly and quickly, and improves the efficiency of managing the conference room.

After the above steps are performed, the lighting equipment that the user requires to be enabled can be determined, and the lighting equipment group number corresponding to the lighting equipment required to be enabled can be further obtained. Subsequently, step S106 is performed, the control panel broadcasts the wireless control command to each lighting equipment through the wireless ad hoc network between the wireless control modules, and then each lighting equipment receives and forwards the wireless control command, and performs a corresponding operation according to the wireless control command. In the example of the present disclosure, the wireless control command carries the lighting equipment group number corresponding to the lighting equipment required to be enabled.

In an optional example, in order to save resources, the lighting equipment group number carried in the wireless control command may be edited. For example, when the lighting equipment in the system are divided into many groups, there will be many corresponding lighting equipment group numbers. In this case, if a plurality of groups of lighting equipment group numbers require to be carried in the wireless control command, it will occupy a lot of bytes and waste resources. In this example, in order to save resources, the control panel can encode a plurality of groups of lighting equipment group numbers corresponding to the lighting equipment required to be enabled according to a preset encryption rule to generate a working group number in a specific format and occupying less resources. Furthermore, the control panel broadcasts a wireless control command carrying the working group number in the specific format to each lighting equipment. Furthermore, according to the encryption rule of this example, the group number of the lighting equipment required to be enabled can be uniformly encoded to generate a working group number in a specific format.

Specifically, in an optional example of the present disclosure, the working group number is generated by encoding according to a preset encryption rule, and has a uniform definition specification. Referring to FIG. 3, the working mode corresponding to the conference room 1 is a report mode; the working mode corresponding to the conference room 2 is a discussion mode; and the working mode corresponding to the conference room 3 is a cleaning mode. In addition, the lighting equipment group number corresponding to the conference room 1 is 1, the lighting equipment group number corresponding to the conference room 2 is 2, and the lighting equipment group number corresponding to the conference room 3 is 3. In this example, if it is determined that the working mode of the currently controlled lighting equipment is the report mode according to the user's triggering, the group number of the lighting equipment required to be enabled can be determined to be 1 by directly querying the table of the correspondence between the working mode and the lighting equipment group number illustrated in FIG. 3. Further, the obtained lighting equipment group number 1 can be encoded according to the preset encryption rule in this example to obtain the working group number 0x1 of the conference room 1, the working group number 0x2 of the conference room 2, and the working group number 0x3 of the conference room 3.

In addition, these independent conference rooms mentioned above can also work together, and can be merged to form a new working mode. For example, there are three different ways of arbitrarily selecting two conference rooms from the above three independent conference rooms for merging: the first way is that the conference room 1 and the conference room 2 are merged to form a working mode; the second way is that the conference room 1 and the conference room 3 are merged to form another working mode; and the third way is that the conference room 2 and the conference room 3 are merged to form still another working mode. In this case, according to the preset encryption rule in this example, the lighting equipment group numbers corresponding to the three different merging methods can be respectively encoded to obtain the working group number of the first combination to be 0x11, the working group number of the second combination to be 0x12 and the working group number of the third combination to be 0x13. According to the method of the example of the present disclosure, all the three independent conference rooms described above can also be merged. In this case, according to the preset encryption rule in this example, the lighting equipment group numbers corresponding to the lighting equipment to be merged are encoded to obtain the merged working group number to be 0x21. In addition, the method of the present disclosure may also use other ways, such as encoding the lighting equipment group number in different bases or other feasible ways to encode the lighting equipment group number to generate a corresponding working group number to achieve the purpose of saving system resources, which is not specifically limited in this example.

After the lighting equipment in the conference room area are combined according to the requirement of the user, and working group numbers in a specific format are generated for the combined lighting equipment, the control panel can directly control the lighting equipment of the corresponding area according to the newly generated working group number. In the example of the present disclosure, the control panel may broadcast a specific working group number to each lighting equipment through wireless networking between wireless control modules in the conference room, and each lighting equipment decodes the received working group number according to a preset decoding rule, and performs a corresponding operation according to the decoded lighting equipment group number.

After the above steps are performed, according to the method of the present disclosure, the user can further control the lighting equipment corresponding to the conference room area in different working modes. First, at least one lighting scene can be preset by the control panel, and the user can further select a lighting scene that meets the requirements through the control panel. Furthermore, the control panel transmits a wireless control command to the lighting equipment corresponding to the current lighting equipment group number through the wireless ad hoc network between the wireless control modules to control the lighting state of the lighting equipment. In this example, the wireless control command broadcasted by the control panel to the lighting equipment carries the lighting scene selected by the user.

In the example of the present disclosure, after the control panel controls the corresponding lighting equipment to perform lighting according to the lighting scene selected by the user, the control panel can also perform scene detection on the lighting equipment in the working state. First, the control panel selects the lighting equipment with the strongest RSSI (Received Signal Strength Indication) among the lighting equipment corresponding to the current working group number through the wireless ad hoc network and establishes a connection. Further, the control panel obtains a target lighting parameter and an actual lighting parameter of the connected lighting equipment.

Each lighting equipment in the conference room is preset with a corresponding target lighting parameter locally, and when the lighting equipment works, the lighting equipment is first started by default with the preset target lighting parameter. However, in actual lighting, the lighting equipment may not meet the lighting requirements of the target lighting parameters due to environmental or other factors.

Therefore, according to the method of this example, it is also necessary to obtain the actual lighting parameter of the currently working lighting equipment. Further, the obtained actual lighting parameter is compared with the target lighting parameter. When the two parameters are different, the control panel may calculate a correction coefficient of the actual lighting parameter according to the target lighting parameter. Then, the control panel adjusts the lighting parameters of the connected lighting equipment according to the calculated correction coefficient, and controls the connected lighting equipment to perform lighting according to the adjusted lighting parameters. Furthermore, according to the method of the present disclosure, the corrected lighting parameters may also be stored in the corresponding lighting equipment, and when the lighting equipment works again, the lighting equipment is started by default with the corrected lighting parameters.

Specifically, in this example, after lighting is performed according to the lighting scene selected by the user, if the lighting scene is not actually calibrated, the color sensor of the control panel starts to work. First, the color sensor is connected to any lighting equipment working in the current lighting scene, obtains its target lighting parameters, and detects actual lighting parameters such as the actual ambient illuminance. If there is a difference between the target lighting parameter and the corresponding actual lighting parameter, the color sensor transmits a light compensation adjustment command to fine-tune the lighting equipment until lighting is stable. In this example, the compensation parameters in the adjustment command are saved locally, and the lighting equipment continues to work based on the adjusted parameters. In this way, the lighting of the lighting equipment will not be affected by different conference rooms, such as whether there are windows through natural light or weather factors.

According to the example of the present disclosure, after the lighting parameters of the connected lighting equipment are adjusted by the control panel, the obtained correction coefficient can also be transmitted by the control panel to all lighting equipment corresponding to the current lighting equipment group number. In addition, the lighting parameters of all the lighting equipment corresponding to the current lighting equipment group number are adjusted according to the correction coefficient, and all the lighting equipment corresponding to the current lighting equipment group number are controlled to perform lighting according to the adjusted lighting parameters. In addition, the adjusted lighting parameters can also be updated and saved in the corresponding lighting equipment for subsequent lighting.

In addition, the example of the present disclosure can also customize the lighting scene of the conference room, and the control panel can configure the lighting scene for any lighting equipment in the conference room through the wireless ad hoc network. For example, the user can perform operations such as power-on, power-off, brightness adjustment, color temperature adjustment, brightness and color temperature combination illumination settings on any lighting equipment through the control panel. In addition, the user does not need to calculate or know specific technical values of brightness and color temperature, several brightness and color temperature data combinations can be preset in the control panel, and the users only needs to select the corresponding data combination to complete the update and configuration of custom scene combinations.

After the above steps are performed, in order to make the lighting of the conference room more intelligent and realize the automatic management of large conferences, the example of the present disclosure can also perform more advanced system configuration through the control panel to realize fully automatic control of the conference. Specifically, different timing time are set for different scene modes through the internal timer of the control panel, and when the timing time of each scene mode is reached, it automatically switches to the next preset scene mode. This method supports cascading the scene modes of the conference room, and automatically switches various scene modes according to the preset timing time. The lighting scene of the conference room can be automatically switched through the internal timer, instead of active switching through the control panel, which is convenient for the participants to control the progress of the conference without paying special attention, interrupting, reminding, etc. The automatic switching of lighting scenes of conference rooms has also made the conference more humane, enabling participants to participate in the conference more relaxedly and efficiently.

Figure 5:
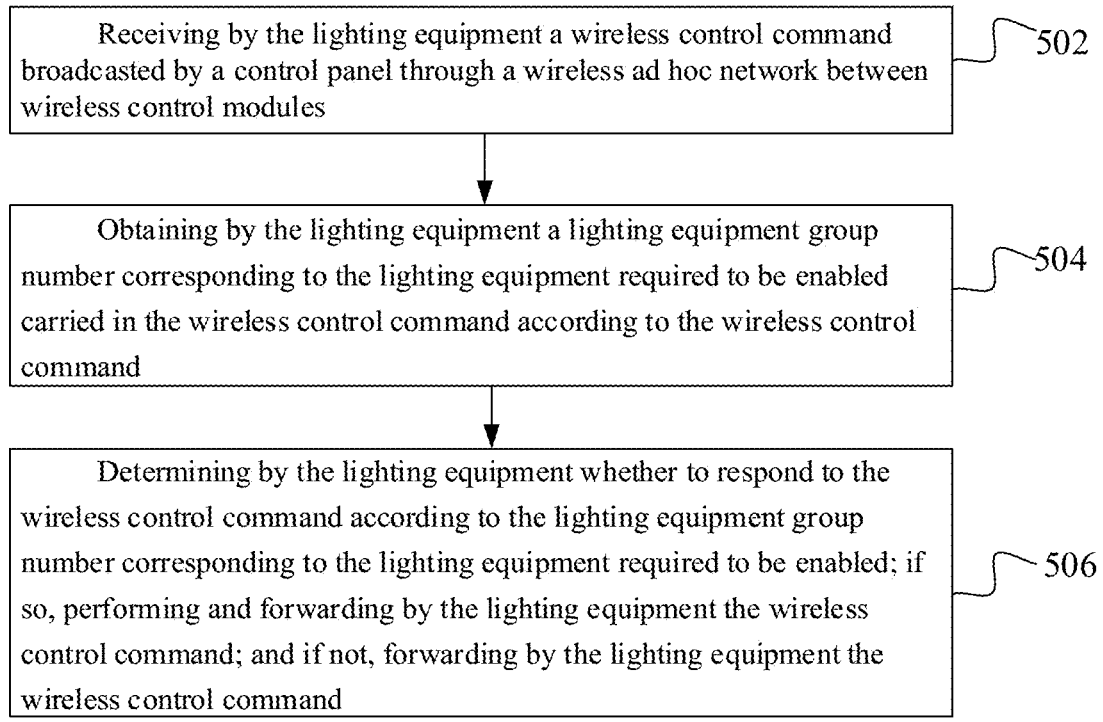
FIG. 5 is a schematic flowchart of a method for controlling partition lighting of a conference room based on a wireless networking technology which is applied to lighting equipment according to an example of the present disclosure.

Based on the method for controlling partition lighting of a conference room based on the wireless networking technology and applied to the control panel provided by the foregoing examples, based on the same inventive concept, an example of the present disclosure provides a method for controlling partition lighting of a conference room based on the wireless networking technology and applied to a lighting equipment. FIG. 5 is a schematic flowchart of a method for controlling partition lighting of a conference room based on the wireless networking technology and applied to a lighting equipment according to an example of the present disclosure. As illustrated in FIG. 5, the method includes at least steps S502 to S506 (or represented by steps J to L):

Step S502: receiving by the lighting equipment a wireless control command broadcasted by a control panel through a wireless ad hoc network between wireless control modules;

Step S504: obtaining by the lighting equipment a lighting equipment group number corresponding to the lighting equipment required to be enabled carried in the wireless control command according to the wireless control command;

Step S506: determining by the lighting equipment whether to respond to the wireless control command according to the lighting equipment group number corresponding to the lighting equipment required to be enabled; if so, performing and forwarding by the lighting equipment the wireless control command; and if not, forwarding by the lighting equipment the wireless control command.

In an example, the lighting equipment decodes the lighting equipment group number of the specific format corresponding to the lighting equipment required to be enabled according to the preset decryption rule, to obtain each decoded independent lighting equipment group number;

The lighting equipment determines whether to respond to the wireless control command according to each decoded independent lighting equipment group number.

In an example, the lighting parameters that match the lighting scenes of the control panel can be preset by the lighting equipment;

The lighting equipment receives and forwards the wireless control command transmitted by the control panel, and the wireless control command carries a lighting scene selected by a user;

The lighting equipment performs lighting according to lighting parameters corresponding to the lighting scene selected by the user.

In addition, the examples provided by the present disclosure can be arbitrarily combined into a new example, which is not described in detail herein.

It can be known that, in the examples of the present disclosure, the control panel can directly perform a series of control on the lighting equipment, for example, control the on-off, brightness, color temperature, etc., of the lighting equipment, and can preset a variety of different lighting scenes for the lighting equipment, so that the lighting equipment can create different lighting effects. In addition, this example realizes the rapid separation and combination of conference rooms based on the grouping of lighting equipment, expands the use range of conference rooms, and improves the management level and use efficiency of conference rooms. In addition, the lighting equipment and the control panel in this example can realize intelligent control only through a wireless network, each equipment exists as a node in the network, and the control command can be transmitted through any node. When any node in the network is damaged, the continuous operation of other nodes will not be affected. In addition, this example does not have too many requirements for the deployment and installation of hardware, nor does it require strict wiring, which facilitates the expansion of any lighting equipment node.

In the following, the method for controlling partition lighting of the conference room based on the wireless networking technology of the present disclosure will be described in detail with specific examples.

Figure 6A:
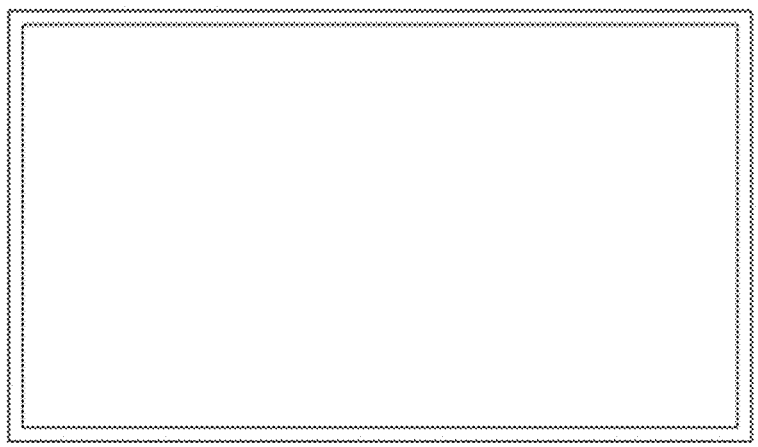
FIG. 6a is a schematic diagram of lighting of a large conference room according to an example of the present disclosure.
Figure 6B:
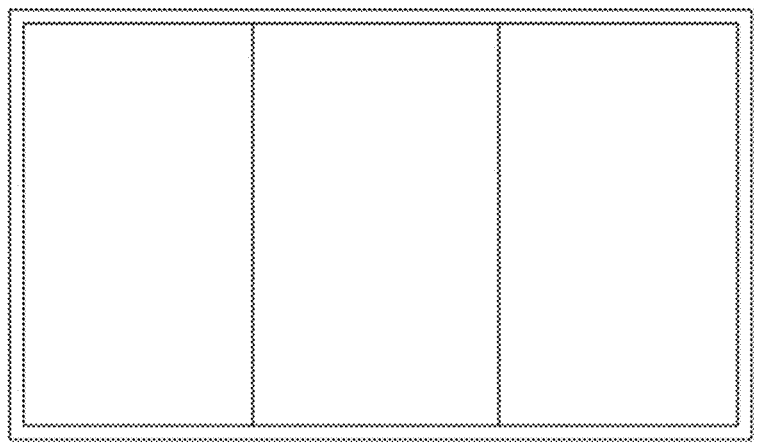
FIG. 6b is a schematic diagram of independent lighting of three small conference rooms formed by partitioning control of the large conference room in FIG. 6a according to an example of the present disclosure.

The first example is based on FIG. 6a and FIG. 6b. FIG. 6a is a schematic diagram illustrating lighting of a large conference room according to an example of the present disclosure. FIG. 6b is a schematic diagram illustrating independent lighting of three small conference rooms by partition controlling the large conference room in FIG. 6a according to an example of the present disclosure. In this example, if the partition controlling of the conference room is realized by the traditional wired control method, not only the wiring workload and the reconstruction cost are large, but also the switch wiring of the lighting equipment in the actual application must be handled by professional staff with complicated operating steps.

In this example, according to the method for controlling partition lighting of a conference room based on the wireless networking technology of the present disclosure, first, the lighting equipment of the conference room are grouped. In this example, the lighting equipment can be grouped according to the installation positions or functional characteristics of the lighting equipment, and an independent lighting equipment group number is matched for each group of lighting equipment after the grouping. Then, wireless control modules are provided to the lighting equipment and the corresponding control panels in the conference room, a wireless ad hoc network can be established between the wireless control modules, and the control panel controls the lighting equipment in the conference room through the wireless ad hoc network. With the method of the present disclosure, it only needs to perform grouping logical control on the lighting equipment, and the control panel transmits different wireless control commands to different lighting equipment groups to control the corresponding lighting equipment groups to perform different operations, so the setting of the conference room can be quickly realized by wireless control.

Figure 7:
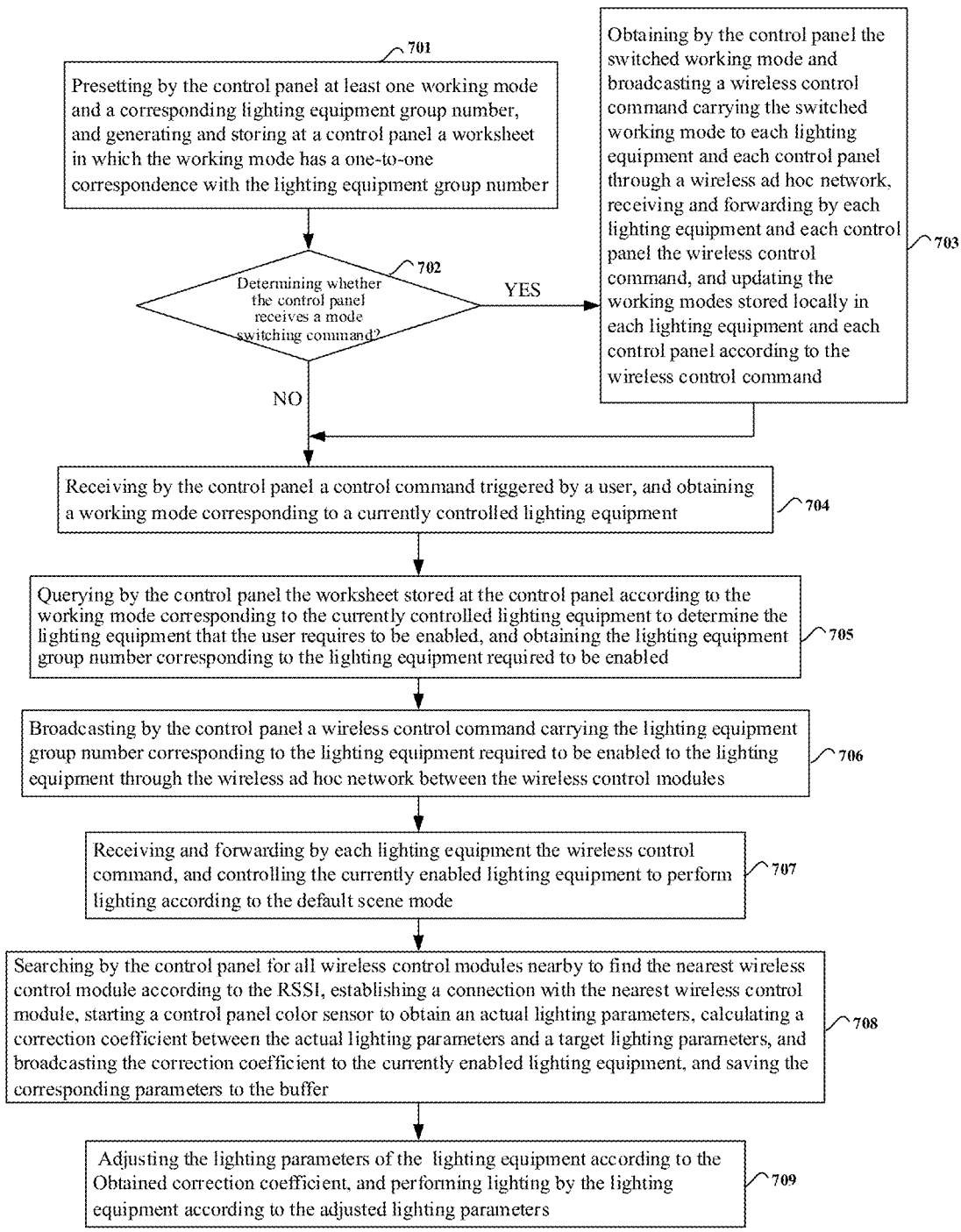
FIG. 7 is a specific flowchart of a method for controlling partition lighting of a conference room based on a wireless networking technology according to an example of the present disclosure.

Specifically, FIG. 7 is a specific flowchart of a method for controlling partition lighting of a conference room based on a wireless networking technology according to an example of the present disclosure. As illustrated in FIG. 7, the method for controlling partition lighting of the conference room includes at least steps S701 to S709:

Step S701: presetting by the control panel at least one working mode and a corresponding lighting equipment group number, and generating and storing at a control panel a worksheet in which the working mode has a one-to-one correspondence with the lighting equipment group number;

Step S702: determining whether the control panel receives a mode switching command, If so, performing step S703; and if not, performing step S704;

Step S703: obtaining by the control panel the switched working mode and broadcasting a wireless control command carrying the switched working mode to each lighting equipment and each control panel in the conference room through a wireless ad hoc network between the wireless control modules, receiving and forwarding by each lighting equipment and each control panel the wireless control command, and updating the working modes stored locally in each lighting equipment and each control panel according to the wireless control command;

Step S704: receiving by the control panel a control command triggered by a user, and obtaining a working mode corresponding to a currently controlled lighting equipment;

Step S705: querying by the control panel the worksheet stored at the control panel according to the working mode corresponding to the currently controlled lighting equipment to determine the lighting equipment that the user requires to be enabled, and obtaining the lighting equipment group number corresponding to the lighting equipment required to be enabled;

Step S706: broadcasting by the control panel a wireless control command carrying the lighting equipment group number corresponding to the lighting equipment required to be enabled to the lighting equipment through the wireless ad hoc network between the wireless control modules;

Step S707: receiving and forwarding by each lighting equipment the wireless control command, and controlling the currently enabled lighting equipment to perform lighting according to the default scene mode;

Step S708: searching by the control panel for all wireless control modules nearby to find the nearest wireless control module according to the RSSI calculation, establishing a connection with the nearest wireless control module, starting a control panel color sensor to obtain an actual lighting parameters, calculating a correction coefficient between the actual lighting parameters and a target lighting parameters, and broadcasting the correction coefficient to the currently enabled lighting equipment, and saving by the currently enabled lighting equipment the corresponding parameters to the buffer;

Step S709: adjusting the lighting parameters of the currently enabled lighting equipment according to the corresponding target lighting parameters and the correction coefficient, and performing lighting by the currently enabled lighting equipment according to the adjusted lighting parameters.

The above is the specific partition switching control method of the method for controlling partition lighting of a conference room based on the wireless networking technology of the present disclosure. With this method, the user can perform various switching adjustments to the conference room according to actual needs, and can quickly control the switched conference room.

This second example is applied to a case where the lighting scene of the switched conference room is directly controlled after the partition switching of the conference room is completed. In this example, a plurality of different modes of lighting scenes can be preset first, and specific lighting parameters can be matched for different lighting scenes. The lighting parameters of different lighting scenes are all stored locally in the lighting equipment. After receiving the corresponding lighting scene command transmitted by the control panel, the lighting equipment perform lighting according to the corresponding lighting parameters to realize the switching control of the lighting scene of the conference room.

In this example, multiple lighting scenes can be preset, such as welcome mode, discussion mode, lecture mode, rest mode, cleaning mode, leaving mode, and so on. The lighting scenes of multiple modes are described in detail below.

Welcome mode: The lights are automatically turned on or brightened to achieve the appropriate conference brightness. If the lighting equipment in the conference room cooperates with the main light source, soft light source, and background light, the brightness of the main light source must be higher than that of the soft light source and background light. In addition, lighting paths are required to be turned on as much as possible, and the power supply is relatively sufficient to create a warm conference atmosphere.

Discussion mode: The brightness of the light is weaker than the conference mode.

Lecture mode: The light will be automatically adjusted to meet only the requirements of the conference table lighting, so that participants can easily read the materials or make conference records. In this case, the main light source is turned on less or not, and the auxiliary light source or the local light strip is used as the main light source.

Rest mode: The lights are automatically dimmed and some lights are turned off. In this case, the main light source is turned on less, and the illumination of the light source is moderate to create a relaxed and comfortable lighting effect.

Cleaning mode: The light is automatically adjusted to meet only the brightness requirements required for cleaning.

Leaving mode: All the lighting equipment in the conference room are turned off.

Figure 8:
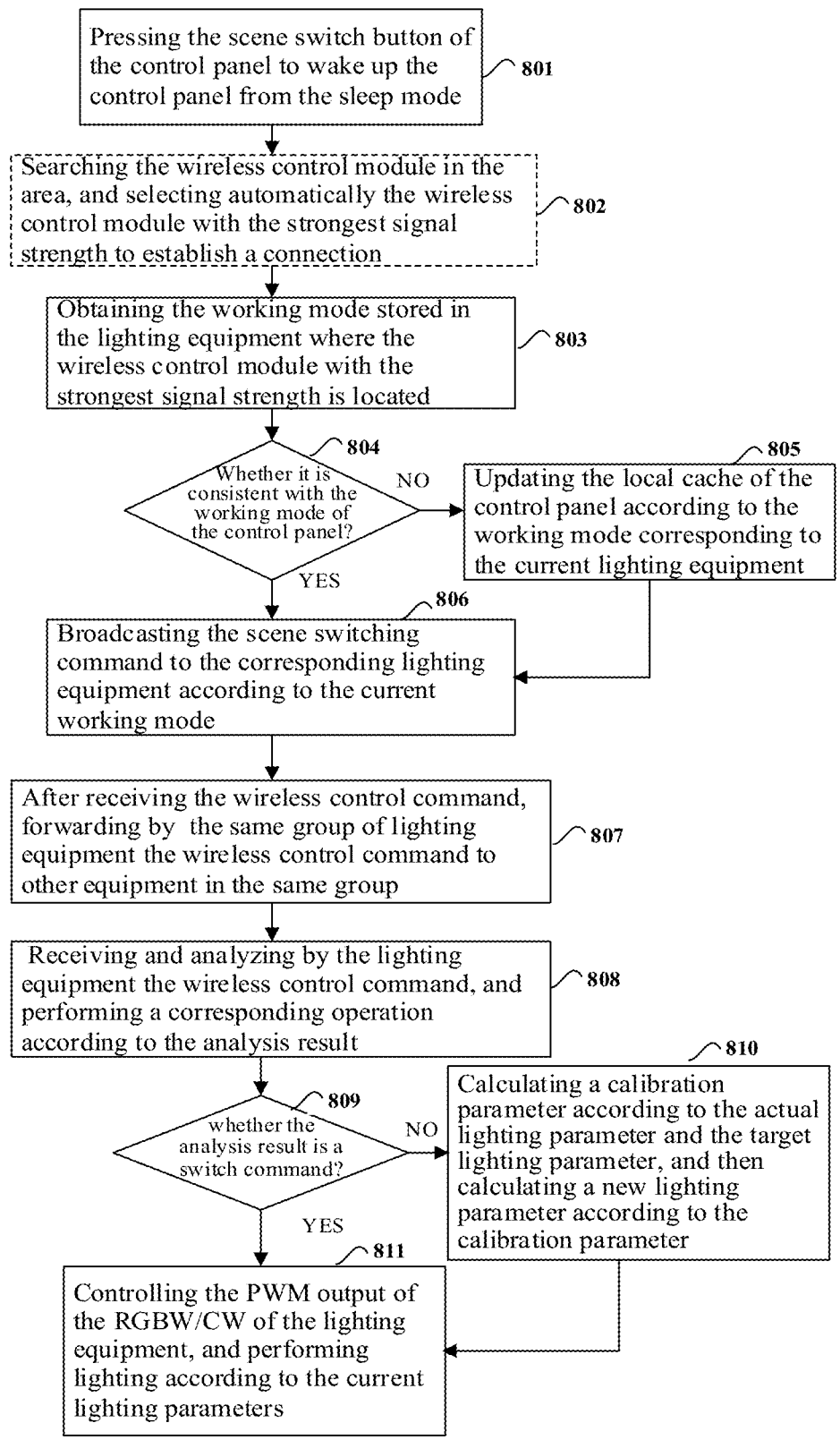
FIG. 8 is a flowchart of a method for switching a lighting scene mode of a conference room based on a wireless networking technology according to an example of the present disclosure.

In this example, after presetting a plurality of modes of lighting scenes, the control panel can control the mode switching of the lighting scenes of the conference room according to the different requirements of the user. For a specific switching method, refer to FIG. 8. FIG. 8 is a flowchart of a method for switching mode of a lighting scene of a conference room based on a wireless networking technology. As illustrated in FIG. 8, the method for switching modes of the lighting scene includes at least steps S801 to S811:

Step S801: pressing by the user the scene switch button of the control panel to wake up the control panel from the sleep mode;

Step S802: searching the RSSI of the wireless control module in the area, and selecting the wireless control module with the strongest signal strength to establish a connection;

Step S803: obtaining the working mode stored in the lighting equipment where the wireless control module with the strongest signal strength is located;

Step S804: determining whether the working mode stored in the lighting equipment is consistent with the working mode stored in the control panel; if so, performing step S806; and if not, performing step S805;

Step S805: updating the local cache of the control panel according to the working mode corresponding to the current lighting equipment;

Step S806: broadcasting the scene switching command to the corresponding lighting equipment according to the current working mode;

Step S807: after receiving the wireless control command, forwarding by the wireless control module of the same group of lighting equipment the wireless control command to other equipment in the same group;

Step S808: receiving and analyzing by the wireless control module of the lighting equipment the wireless control command, and performing a corresponding operation according to the analysis result;

Step S809: determining whether the analysis result is a switch command that controls the lighting equipment to be turned on or off; if so, performing step S811; and if not, performing step S810;

Step S810: calculating a calibration parameter according to the actual lighting parameter and the target lighting parameter of the current lighting scene, and then calculating a new lighting parameter according to the calibration parameter.

Step S811: controlling by the wireless control module the PWM output of the RGBW/CW (color temperature control) of the lighting equipment, and performing lighting by the lighting equipment according to the current lighting parameters.

It should be noted that the dotted line in FIG. 8 indicates that the corresponding operation is optional and not necessary. For example, in steps S802 and S807, after the control panel is awakened, it is not necessary to connect the lighting equipment with the strongest RSSI signal, any lighting equipment that can be connected can be selected, and then the working mode stored at the lighting equipment is obtained. As long as it is determined that the working mode stored at the lighting equipment terminal is consistent with the working mode stored at the control panel, the lighting equipment can be controlled by the control panel to achieve the control of any lighting equipment.

In the implementation of this method, the process of implementing the lighting scene of each conference room is the same no matter it is a large conference room after being merged or individual small conference rooms after being separated. They all need to transmit wireless control commands through the lighting scene switching buttons on the control panel, and then the corresponding lighting equipment automatically completes a series of actions to meet the needs of corresponding scene transitions. The illuminance parameters required in different conference scenes are uniformly defined, and the lighting parameters of the lighting equipment are designed according to the lighting scenes of different modes and the actual location of the lighting equipment in the conference room, and are stored in the local cache of the lighting equipment. These preset parameters are obtained through comprehensive calculation. In this example, the scene lighting is controlled through the combination of the environmental illuminance standard and the actual calibration coefficient to ensure that the overall lighting requirements required by the conference room are met.

For example, assuming that the entire center of the conference room is a conference table, the lighting of the conference table is the most important, the value of the local illuminance should reach 500 Lux (illuminance unit), and the specular reflection on the surface of the table needs to be minimized. In addition, the application of various presentation equipment must be considered, such as the lighting of a writing board, the control of indoor lighting equipment when using a projector, and a slide recorder. On an important occasion, lighting effects can play a very important role in the entire environment. This example not only uses various light sources, but also creates a variety of lighting effects through dimming and scene setting of different light sources, thereby providing a variety of different space environments, giving people a comfortable and perfect conference vision.

In addition, when the lighting parameters of the lighting equipment in the conference room are configured, it will also vary depending on the light source used. For example, the conference room generally uses a cold light source with a color temperature of 3200K, so that uncomfortable conditions such as dazzling and burning due to long-term lighting will not occur. In addition, in case of speech reports, the average illumination in the chairman area is not less than 800 Lux, the average illumination in the general area is not less than 500 Lux, and the illumination around the monitor or the large screen projector is between 50 Lux and 80 Lux, otherwise the viewing effect will be affected.

In this example, by setting lighting scenes of different modes for the conference room in advance, one-click switching of the lighting mode of the conference room can be quickly performed. According to the method described above, whether it is a spotlight, overhead light, or auxiliary light in a conference room, it is not necessary to perform many debugging, switching, and other operations through many switches, and all of them can be directly configured according to preset parameters through one-click switching. For example, at the end of the conference, it can be switched to leaving mode with one-click, and all the lighting equipment in the conference room can be automatically turned off after receiving the signal, so the user can leave without worry. In addition, in this example, a variety of operations controlled by buttons can be implemented on the basis of one-click switching, and different functions are added to the buttons. For example, the one-touch function, when the user triggers a button, enables simultaneous actions such as turning off the main light and adjusting the soft sub-light. In this way, if the meeting is in a tense stage, there is no need to turn on or off the switch or test the lights multiple times, saving a lot of time and improving the efficiency of the meeting.

After the above steps are performed, the lighting scene of the conference room can be switched. In this case, all the connections can be disconnected, and the connection will be established again when the next lighting scene switch comes.

In the third example, different timing times are set for different scene modes through the timer of the control panel, and when the timing time of a scene mode is reached, it automatically switches to the next preset scene mode. The method supports cascading the scene mode of the conference room and automatically switches between various scene modes according to a preset timing time, so as to realize the automatic management of a large conference.

Figure 9:
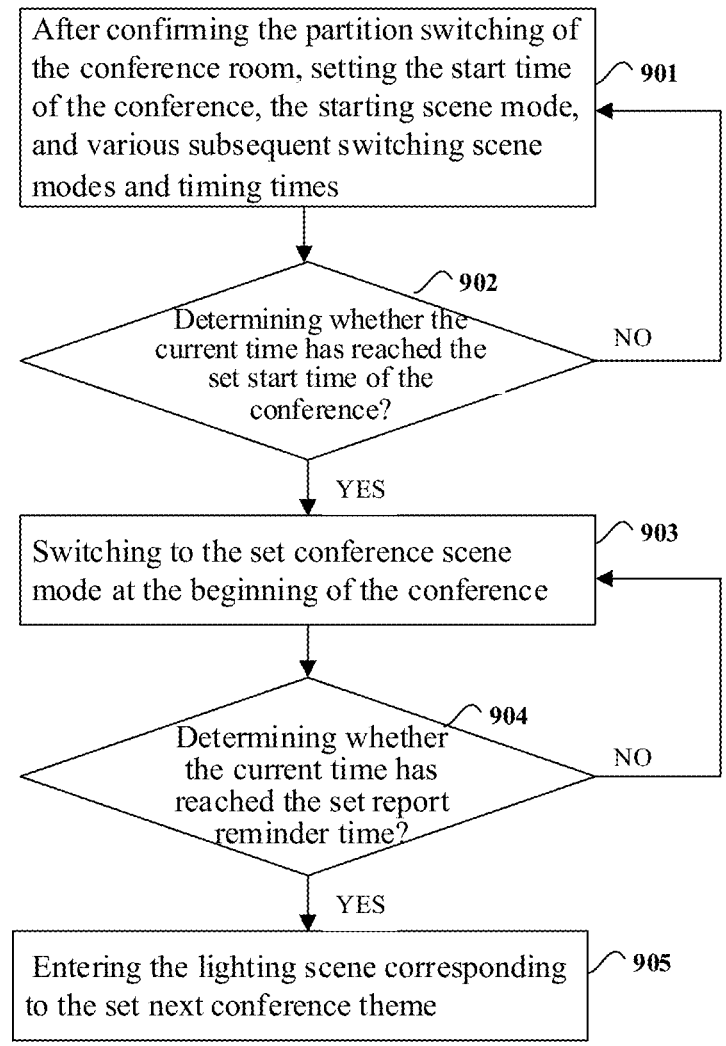
FIG. 9 is a flowchart of a method for automatically switching a scene mode of a conference room in a conference report according to an example of the present disclosure.

This example takes a conference report as an example. FIG. 9 is a flowchart of a method for automatically switching a scene mode of a conference room in a conference report according to an example of the present disclosure. As illustrated in FIG. 9, the method includes at least steps S901 to S905:

Step S901: after confirming the partition switching of the conference room, setting the start time of the conference, the starting scene mode, the scene mode and timing time at the beginning of the meeting, the switched report reminder scene mode and timing time, and other scene modes to be switched and the corresponding timing time;

Step S902: determining whether the current time has reached the start time of the conference; if so, performing step S903; and if not, performing step S901;

Step S903: switching to the set conference scene mode at the beginning of the conference;

Step S904: determining whether the current time has reached the set report reminder time. If so, switching to the report reminder scene mode automatically; and if not, performing step S903, and repeating the loop until all reports are completed.

Step S905: entering the lighting scene corresponding to the set next conference theme.

In practical applications, if the conference is set to start at 13:00, each person will speak for 15 minutes, the next 5 minutes will be the comment time, then the next person will speak for 15 minutes, then the next 5 minutes will be the comment time, and so on, every four people's speech is a round. After one round, it is the break time. After two rounds, the entire conference ends. Through the automatic switching method of the conference mode described above, no additional staff is required to prompt the speaker through the time card, and the control of the conference agenda can be achieved only by switching different lighting effects in the conference room, saving a lot of manpower, material resources and time and improving the efficiency of the conference.

Therefore, in the method of the example of the disclosure, the control panel controls the lighting equipment of the conference room through a wireless network. This method does not require to configure multiple switches for multiple equipment, and does not require to establish complex hardware circuits, and the user can adjust the switch, brightness, color temperature, etc. of the lighting equipment in the conference room at any position only through the control panel, which provides convenience to users. In addition, this method can establish a connection with the network through the wireless networking technology, which is powerful and widely used. In addition, each lighting equipment group can also be arbitrarily configured and combined, which realizes the custom configuration and interchange of the system in a real sense, and intelligently realizes the separation and combination of lighting in several conference room space areas. In addition, the present disclosure can also simply and quickly set different lighting scenes for different conference areas through the control panel according to the needs of users to adapt to different lighting effects under different conference states. Each conference area is controlled independently, which reduces the management work of the lighting switch of the conference room while improving the efficiency of the use of the conference room, thereby improving the user experience.

Furthermore, the present disclosure can also be widely used in commercial lighting systems of various large, small and medium-sized conference rooms, and can also be partially applied to the control of systems in different areas of daily homes. The present disclosure can be well connected and controlled with other intelligent subsystems in a conference room, such as a sound reinforcement system, a conference discussion system, an automatic tracking camera system, a multimedia video system, and other subsystems. The combination of the above systems and the lighting system organically integrates the equipment of the conference environment into a whole, realizing the intelligent management of the conference.

Figure 10:
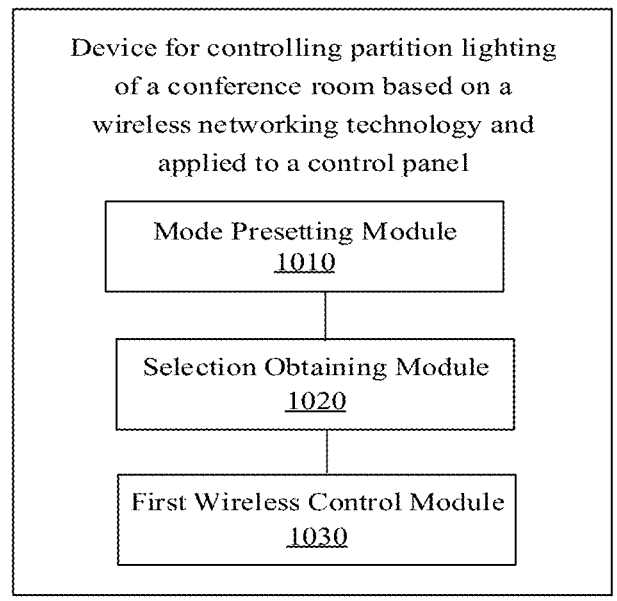
FIG. 10 is a first schematic block diagram of a device for controlling partition lighting of a conference room based on a wireless networking technology according to an example of the present disclosure.

Based on the methods provided by the above examples and based on the same inventive concept, an example of the present disclosure also provides a device for controlling partition lighting of a conference room based on a wireless networking technology, which is applied to a control panel that controls the working state of the lighting equipment in the conference room. The lighting equipment in the conference room is divided into at least one group according to the area, and each group of lighting equipment has an independent lighting equipment group number. The control panel and lighting equipment are equipped with wireless control modules, and a wireless network can be established between the wireless control modules. As illustrated in FIG. 10, the device includes:

a mode presetting module 1010 configured to preset, by the control panel, at least one working mode and a corresponding lighting equipment group number, and generate and store at the control panel a worksheet in which corresponding to the working modes have a one-to-one correspondence with the lighting equipment group number;

a selection obtaining module 1020 coupled to the mode presetting module 1010 and configured to query, by the control panel, the worksheet stored at the control panel according to the lighting requirements of the user to determine the lighting equipment that the user requires to be enabled, and obtain the lighting equipment group number corresponding to the lighting equipment required to be enabled;

a first wireless control module 1030 coupled to the selection obtaining module 1020 and configured to broadcast, by the control panel, the wireless control command carrying the lighting equipment group number corresponding to the lighting equipment required to be enabled to the lighting equipment through the wireless ad hoc network between the wireless control modules, receive and forward, by each lighting equipment, the wireless control commands, and perform corresponding operations according to the wireless control commands.

In an example, the selection obtaining module 1020 is further configured to:

receive, by the control panel, the control command triggered by the user, and obtain the working mode corresponding to the currently controlled lighting equipment, in which each lighting equipment stores the working mode most recently received;

query, by the control panel, the worksheet stored at the control panel according to the working mode corresponding to the currently controlled lighting equipment to determine the lighting equipment that the user requires to be enabled, and obtain the lighting equipment group number corresponding to the lighting equipment required to be enabled.

Figure 11:
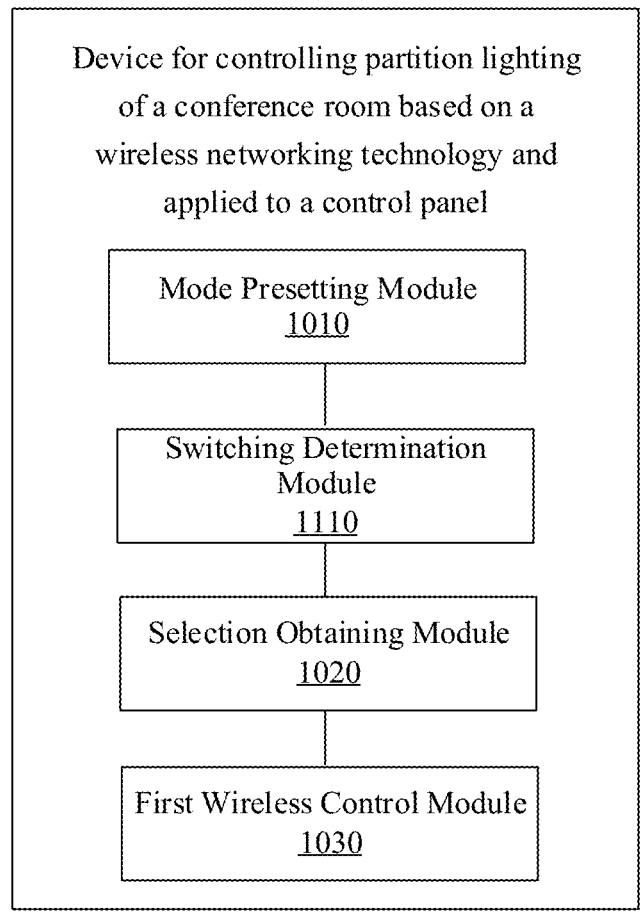
FIG. 11 is a second schematic block diagram of a device for controlling partition lighting of a conference room based on a wireless networking technology according to an example of the present disclosure.

In an example, as illustrated in FIG. 11, the device further includes:

a switching determination module 1110 coupled to the mode presetting module 1010 and configured to determine whether the control panel receives a mode switching command, and if so, obtain the switched working mode through the control panel;

broadcast, by the control panel, the wireless control commands carrying the switched working mode to the lighting equipment and the control panels in the conference room through the wireless ad hoc network between the wireless control modules, receive and forward, by the lighting equipment and the control panels, the wireless control commands, and update the working modes locally stored in each lighting equipment and each control panel according to the wireless control commands.

In an example, the first wireless control module is further configured to:

encode, by the control panel, the lighting equipment group number corresponding to the lighting equipment required to be enabled according to the set encryption rule to generate a working group number in a specific format;

broadcast, by the control panel, a wireless control command carrying a working group number in a specific format to each lighting equipment through a wireless ad hoc network between the wireless control modules.

Figure 12:
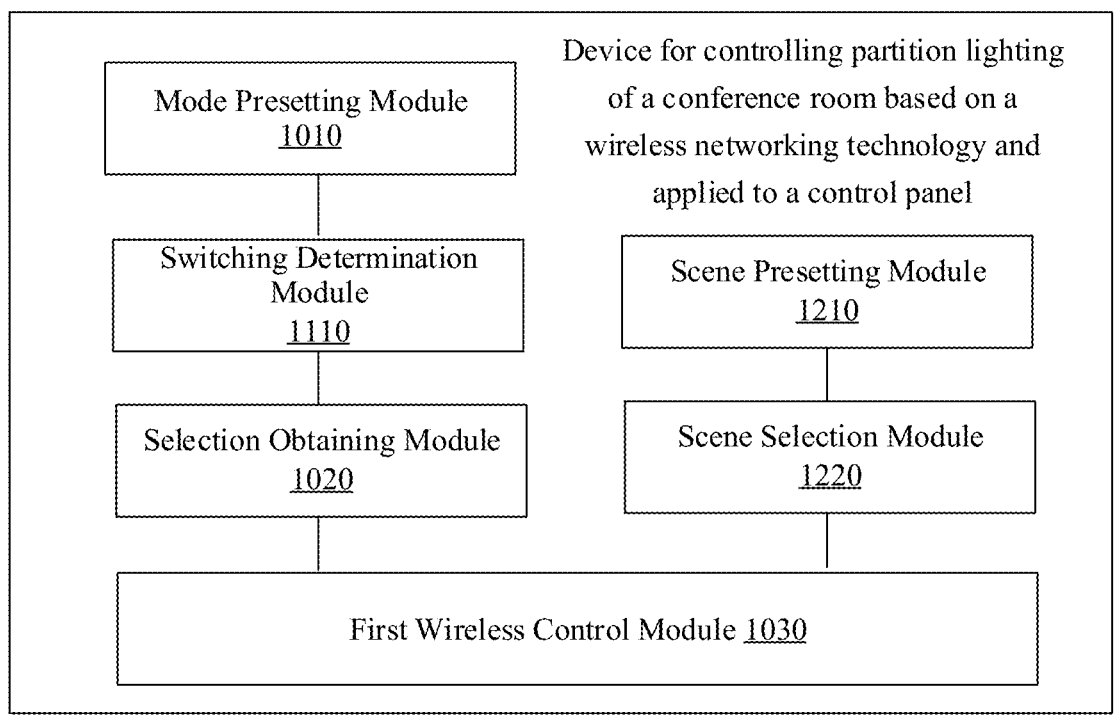
FIG. 12 is a third schematic block diagram of a device for controlling partition lighting of a conference room based on a wireless networking technology according to an example of the present disclosure.

In an example, as illustrated in FIG. 12, the device further includes:

a scene presetting module 1210 configured to preset, by the control panel, at least one lighting scene;

a scene selection module 1220 coupled to the scene presetting module 1210 and configured to select, by the control panel, a corresponding lighting scene according to the requirements of the user;

a first wireless control module 1030 coupled to the scene selection module 1220 and further configured to transmit, by the control panel, a wireless control command to the lighting equipment corresponding to the current lighting equipment group number through the wireless ad hoc network between the wireless control modules to control the lighting status of the lighting equipment, in which the wireless control command carries the lighting scene selected by the user.

Figure 13:
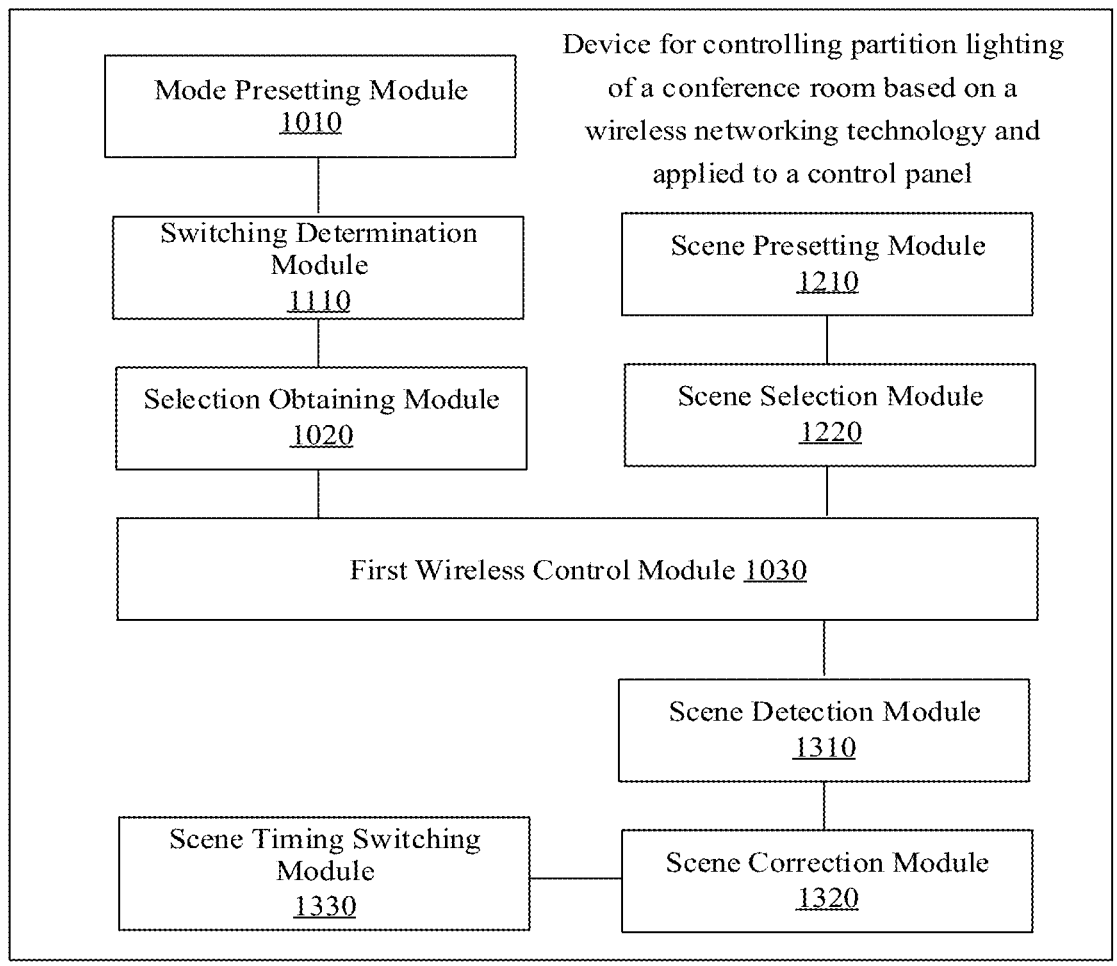
FIG. 13 is a fourth schematic block diagram of a device for controlling partition lighting of a conference room based on a wireless networking technology according to an example of the present disclosure.

In an example, as illustrated in FIG. 13, the device further includes:

the first wireless control module 1030 further configured to select, by the control panel, a lighting equipment with the strongest RSSI intensity among the lighting equipment corresponding to the current lighting equipment group number through a wireless ad hoc network and establish a connection; and obtain, by the control panel, a target lighting parameter and an actual lighting parameter of the connected lighting equipment;

a scene detection module 1310 coupled to the first wireless control module 1030 and configured to calculate, by the control panel, a correction coefficient of the actual lighting parameter according to the target lighting parameter; and adjust, by the control panel, the lighting parameters of the connected lighting equipment according to the correction coefficient, and control the connected lighting equipment to perform lighting according to the adjusted lighting parameters.

In an example, as illustrated in FIG. 13, the device further includes:

a scene correction module 1320 coupled to the scene detection module 1310 and configured to transmit, by the control panel, the correction coefficients to all the lighting equipment corresponding to the current lighting equipment group number; and adjust the lighting parameters of all lighting equipment corresponding to the current lighting equipment group number according to the correction coefficient, and control all the lighting equipment corresponding to the current lighting equipment group number to perform lighting according to the adjusted lighting parameters.

In an example, as illustrated in FIG. 13, the device further includes:

a scene timing switching module 1330 coupled to the scene correction module 1320 and configured to set different timing times for different scene modes through a timer of the control panel; switch automatically to the next preset scene mode when the timing time of each scene mode is reached.

Figure 14:
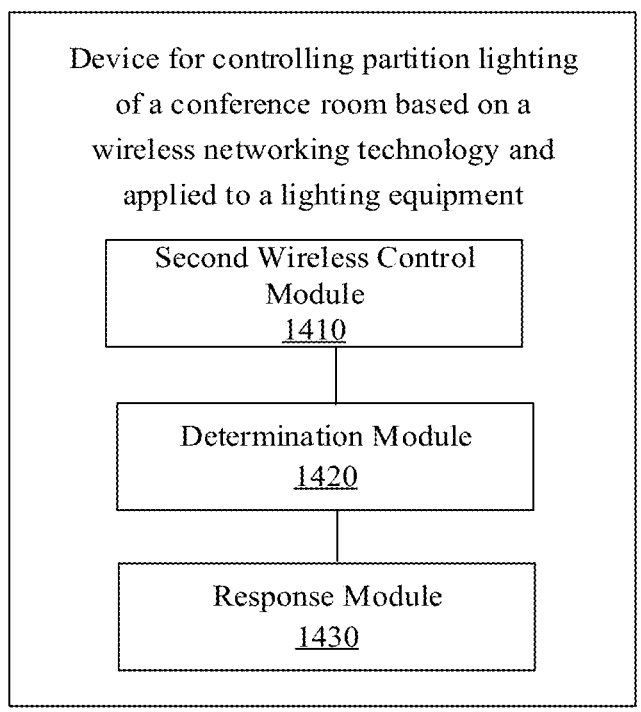
FIG. 14 is a fifth schematic block diagram of a device for controlling partition lighting of a conference room based on a wireless networking technology according to an example of the present disclosure.

Based on the methods provided by the above examples and based on the same concept, a device for controlling partition lighting of a conference room based on a wireless networking technology is also provided, which is applied to a lighting equipment that receives a control signal of a control panel, the control panel and the lighting equipment are provided with wireless control modules, and a wireless ad hoc network can be established between the wireless control modules. As illustrated in FIG. 14, the device includes:

a second wireless control module 1410 configured to receive, by the lighting equipment, the wireless control command broadcasted by the control panel through the wireless ad hoc network between the wireless control modules;

a determination module 1420 coupled to the second wireless control module 1410 and configured to obtain, by the lighting equipment and according to the wireless control command, the lighting equipment group number corresponding to the lighting equipment required to be enabled that is carried in the wireless control command;

a response module 1430 coupled to the determination module 1420 and configured to determine, by the lighting equipment, whether itself needs to respond to the wireless control command according to the lighting equipment group number corresponding to the lighting equipment required to be enabled; If so, the lighting equipment performs and forwards the wireless control command, and if not, the lighting equipment forwards the wireless control command.

In an example, the response module is further configured to:

decode, by the lighting equipment, the lighting equipment group number of the specific format corresponding to the lighting equipment required to be enabled according to the set decryption rule to obtain each decoded independent lighting equipment group number;

determine, by the lighting equipment, whether itself needs to respond to the wireless control command according to the decoded independent lighting equipment group number.

Figure 15:
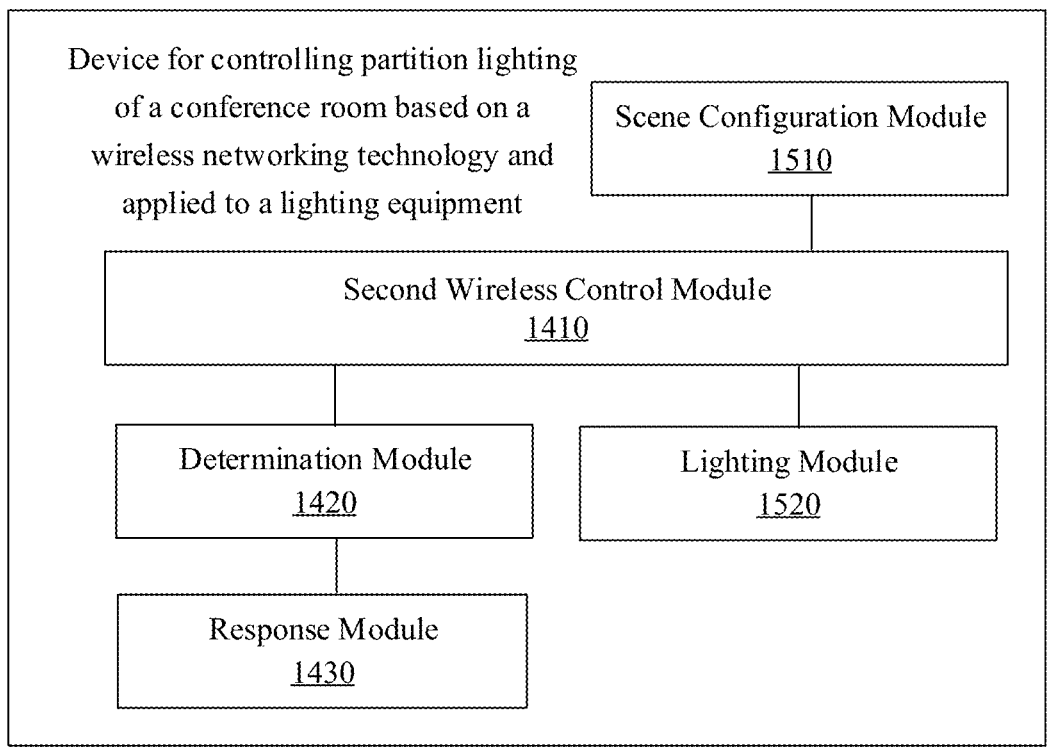
FIG. 15 is a sixth schematic block diagram of a device for controlling partition lighting of a conference room based on a wireless networking technology according to an example of the present disclosure.

In an example, as shown in FIG. 15, the device further includes:

a scene configuration module 1510 configured to preset, by the lighting equipment, lighting parameters that match the lighting scene of the control panel;

the second wireless control module 1410 coupled to the scene configuration module 1510 and configured to receive and forward, by the lighting equipment, the wireless control command transmitted by the control panel, in which the wireless control command carries the lighting scene selected by the user;

a lighting module 1520 coupled to the second wireless control module 1410 and configured to perform, by the lighting equipment, lighting according to a lighting parameter corresponding to a lighting scene selected by a user.

The present disclosure provides a method, a device, and a corresponding system for controlling conference room partition lighting based on a wireless networking technology.

According to one aspect of the disclosure, there is provided a method for controlling partition lighting of a conference room based on a wireless networking technology, the method being applied to a control panel which controls a working state of lighting equipment in the conference room, the lighting equipment in the conference room being divided into at least one group according to areas, each group of lighting equipment having an independent lighting equipment group number, the control panel and the lighting equipment being provided with wireless control modules, and a wireless ad hoc network being established between the wireless control modules, the method comprising:

step A: presetting, by the control panel, at least one working mode and a corresponding lighting equipment group number, and generating and storing at the control panel a worksheet in which the working mode has a one-to-one correspondence with the lighting equipment group number;

step B: querying, by the control panel, the worksheet stored at the control panel according to lighting requirements of a user to determine a lighting equipment that the user requires to be enabled, and obtaining a lighting equipment group number corresponding to the lighting equipment required to be enabled; and step C: broadcasting, by the control panel, a wireless control command carrying the lighting equipment group number corresponding to the lighting equipment required to be enabled to the lighting equipment through the wireless ad hoc network between the wireless control modules, receiving and forwarding, by the lighting equipment, the wireless control command, and performing a corresponding operation according to the wireless control command.

Optionally, the step B comprises:

step B1: receiving, by the control panel, a control command triggered by the user, and obtaining a working mode corresponding to a currently controlled lighting equipment, wherein each lighting equipment stores a working mode most recently received; and step B2: querying, by the control panel, the worksheet stored at the control panel according to the working mode corresponding to the currently controlled lighting equipment to determine the lighting equipment which the user requires to be enabled, and obtaining the lighting equipment group number corresponding to the lighting equipment required to be enabled.

Optionally, prior to the step B, further comprising:

step D: determining whether the control panel receives a mode switching command, and if so, obtaining, by the control panel, a switched working mode; and step E: broadcasting, by the control panel, the wireless control command carrying the switched working mode to each lighting equipment and each control panel in the conference room through the wireless ad hoc network between the wireless control modules, receiving and forwarding, by each lighting equipment and each control panel, the wireless control command, and updating the working mode locally stored in each lighting equipment and each control panel according to the wireless control command.

Optionally, in the step C, the broadcasting, by the control panel, the wireless control command to each lighting equipment through the wireless ad hoc network between the wireless control modules comprises:

step C1: encoding, by the control panel, the lighting equipment group number corresponding to the lighting equipment required to be enabled according to a set encryption rule to generate a working group number in a specific format; and step C2: broadcasting, by the control panel, the wireless control command carrying the working group number in the specific format to each lighting equipment through the wireless ad hoc network between the wireless control modules.

Optionally, the method further comprises:

step F: presetting, by the control panel, at least one lighting scene;

selecting, by the control panel, a corresponding lighting scene according to a requirement of the user; and transmitting, by the control panel, the wireless control command to the lighting equipment corresponding to the current lighting equipment group number through the wireless ad hoc network between the wireless control modules to control the lighting state of the lighting equipment, wherein the wireless control command carries the lighting scene selected by the user.

Optionally, the method further comprises:

step G: selecting, by the control panel, a lighting equipment with a strongest RSSI intensity among the lighting equipment corresponding to the current lighting equipment group number through the wireless ad hoc network, and establishing a connection;

obtaining, by the control panel, a target lighting parameter and an actual lighting parameter of the connected lighting equipment;

calculating, by the control panel, a correction coefficient of the actual lighting parameter according to the target lighting parameter; and adjusting, by the control panel, a lighting parameter of the connected lighting equipment according to the correction coefficient, and controlling the connected lighting equipment to perform lighting, according to the adjusted lighting parameters.

Optionally, the method further comprises:

step H: transmitting, by the control panel, the correction coefficient to all lighting equipment corresponding to the current lighting equipment group number; and adjusting lighting parameters of all the lighting equipment corresponding to the current lighting equipment group number according to the correction coefficient, and controlling all the lighting equipment corresponding to the current lighting equipment group number to perform lighting according to the adjusted lighting parameters.

Optionally, the method further comprises:

step I: setting, by a timer of the control panel, different timing times for different scene modes; and switching automatically to a next preset scene mode in a case where the timing time of a scene mode is reached.

According to another aspect of the present disclosure, there is also provided a method for controlling partition lighting of a conference room based on a wireless networking technology, the method being applied to a lighting equipment which receives and forwards a control signal of a control panel, the control panel and the lighting equipment being provided with wireless control modules, and a wireless ad hoc network being established between the wireless control modules, the method comprising:

step J: receiving, by the lighting equipment, a wireless control command broadcasted by the control panel through the wireless ad hoc network between the wireless control modules;

step K: obtaining, by the lighting equipment and according to the wireless control command, a lighting equipment group number corresponding to a lighting equipment required to be enabled which is carried in the wireless control command; and step L: determining, by the lighting equipment, whether itself needs to respond to the wireless control command according to the lighting equipment group number corresponding to the lighting equipment required to be enabled, if so, performing and forwarding by the lighting equipment the wireless control command, and if not, forwarding the lighting equipment the wireless control command.

Optionally, in the step L, the determining, by the lighting equipment, whether itself needs to respond to the wireless control command according to the lighting equipment group number corresponding to the lighting equipment required to be enabled comprises:

step L1: decoding, by the lighting equipment, the lighting equipment group number in a specific format corresponding to the lighting equipment required to be enabled according to a set decryption rule, and obtaining each decoded independent lighting equipment group number; and step L2: determining, by the lighting equipment, whether itself needs to respond to the wireless control command according to the decoded independent lighting equipment group number.

Optionally, the method further comprises:

step M: presetting, by the lighting equipment, a lighting parameter matching a lighting scene of the control panel;

receiving and forwarding, by the lighting equipment, the wireless control command transmitted by the control panel, wherein the wireless control command carries the lighting scene selected by the user; and performing, by the lighting equipment, lighting according to the lighting parameter corresponding to the lighting scene selected by the user.

According to another aspect of the present disclosure, there is also provided device for controlling partition lighting of a conference room based on a wireless networking technology, the device being applied to a control panel which controls a working state of lighting equipment in the conference room, and the lighting equipment in the conference room being divided into at least one group according to area, each group of lighting equipment having an independent lighting equipment group number, the control panel and the lighting equipment being provided with wireless control modules, and a wireless ad hoc network being established between the wireless control modules, the device comprising:

a mode presetting module, configured to preset, by the control panel, at least one working mode and a corresponding lighting equipment group number, and generate and store at the control panel a worksheet in which the working mode has a one-to-one correspondence with the lighting equipment group number;

a selection obtaining module, configured to query, by the control panel, the worksheet stored at the control panel according to a lighting requirement of a user to determine a lighting equipment that the user requires to be enabled, and obtain a lighting equipment group number corresponding to the lighting equipment required to be enabled; and a first wireless control module, configured to broadcast, by the control panel, a wireless control command carrying the lighting equipment group number corresponding to the lighting equipment required to be enabled to the lighting equipment through the wireless ad hoc network between the wireless control modules, receive and forward, by the lighting equipment, the wireless control command, and perform a corresponding operation according to the wireless control command.

Optionally, the selection obtaining module is further configured to:

receive, by the control panel, a control command triggered by a user, and obtain a working mode corresponding to a currently controlled lighting equipment, wherein each lighting equipment stores a working mode most recently received; and query, by the control panel, the worksheet stored at the control panel according to the working mode corresponding to the currently controlled lighting equipment to determine the lighting equipment which the user requires to be enabled, and obtain the lighting equipment group number corresponding to the lighting equipment required to be enabled.

Optionally, the device further comprises:

a switching determining module, configured to determine whether the control panel receives a mode switching command, and if so, obtain, by the control panel, a switched working mode; and broadcast, by the control panel, a wireless control command carrying the switched working mode to each lighting equipment and each control panel in the conference room through the wireless ad hoc network between the wireless control modules, receive and forward, by each lighting equipment and each control panel, the wireless control command, and update the working mode locally stored in each lighting equipment and each control panel according to the wireless control command.

Optionally, the first wireless control module is further configured to:

encode, by the control panel, the lighting equipment group number corresponding to the lighting equipment required to be enabled according to a set encryption rule to generate a working group number in a specific format; and broadcast, by the control panel, a wireless control command carrying the working group number in the specific format to each lighting equipment through the wireless ad hoc network between the wireless control modules.

Optionally, the device further comprises:

a scene presetting module, configured to preset, by the control panel, at least one lighting scene; and a scene selection module, configured to select, by the control panel, a corresponding lighting scene according to a requirement of the user;

wherein the first wireless control module is further configured to transmit, by the control panel, a wireless control command to the lighting equipment corresponding to the current lighting equipment group number through the wireless ad hoc network between the wireless control modules to control the lighting state of the lighting equipment, wherein the wireless control command carries a lighting scene selected by the user.

Optionally, the first wireless control module is further configured to:

select, by the control panel, a lighting equipment with a strongest RSSI intensity among the lighting equipment corresponding to the current lighting equipment group number through the wireless ad hoc network, and establish a connection; and obtain, by the control panel, a target lighting parameter and an actual lighting parameter of the connected lighting equipment; and the device further comprises:

a scene detection module configured to:

calculate, by the control panel, a correction coefficient of the actual lighting parameter according to the target lighting parameter; and adjust, by the control panel, a lighting parameter of the connected lighting equipment according to the correction coefficient, and control the connected lighting equipment to perform lighting according to the adjusted lighting parameter.

Optionally, the device further comprises:

a scene correction module configured to:

a scene correction module configured to:

transmit, by the control panel, the correction coefficient to all lighting equipment corresponding to the current lighting equipment group number; and adjust lighting parameters of all the lighting equipment corresponding to the current lighting equipment group number according to the correction coefficient, and control all the lighting equipment corresponding to the current lighting equipment group number to perform lighting according to the adjusted lighting parameters.

Optionally, the device further comprises:

a scene timing switching module configured to:

set, by a timer of the control panel, different timing times for different scene modes; and switch automatically to a next preset scene mode in a case where the timing time of a scene mode is reached.

According to another aspect of the present disclosure, there is also provided a device for controlling partition lighting of a conference room based on a wireless networking technology, the device being applied to a lighting equipment which receives and forwards control signals of a control panel, the control panel and the lighting equipment being provided with wireless control modules, and a wireless ad hoc network being established between the wireless control modules, the device comprising:

a second wireless control module, configured to receive, by the lighting equipment, a wireless control command broadcast by the control panel through the wireless ad hoc network between the wireless control modules;

a determining module, configured to obtain, by the lighting equipment and according to the wireless control command, a lighting equipment group number corresponding to the lighting equipment required to be enabled which is carried in the wireless control command; and a response module, configured to determine, by the lighting equipment, whether itself needs to respond to the wireless control command according to the lighting equipment group number corresponding to the lighting equipment required to be enabled, if so, perform and forward by the lighting equipment the wireless control command, and if not, forward by the lighting equipment the wireless control command.

Optionally, the response module is further configured to:

decode, by the lighting equipment, a lighting equipment group number in a specific format corresponding to the lighting equipment required to be enabled according to a set decryption rule to obtain each decoded independent lighting equipment group numbers; and determine, by the lighting equipment, whether itself needs to respond to the wireless control command according to each decoded independent lighting equipment group number.

Optionally, the device further comprises:

a scene configuration module configured to preset, by the lighting equipment, a lighting parameter matching a lighting scene of the control panel;

wherein the second wireless control module is further configured to receive and forward, by the lighting equipment, a wireless control command transmitted by the control panel, wherein the wireless control command carries a lighting scene selected by the user; and the device further comprises a lighting module configured to perform, by the lighting equipment, lighting according to the lighting parameter corresponding to the lighting scene selected by the user.

According to another aspect of the present disclosure, there is also provided a system for controlling partition lighting of a conference room based on a wireless networking technology, the system comprising a control panel and a lighting equipment, the control panel comprising the device according to any one of the above, the lighting equipment comprising the device according to any one of the above, the control panel and the lighting equipment being provided with wireless control modules, and a wireless ad hoc networking being established between the wireless control modules, the control panel broadcasts a wireless control command to the lighting equipment through the wireless ad hoc network, and controls the lighting equipment through the wireless control command; and the lighting equipment receives and forwards the wireless control command broadcasted by the control panel through the wireless ad hoc network, and performs a corresponding operation according to the wireless control command.

According to the method for controlling partition lighting of a conference room based on the wireless networking technology of the present disclosure, first, the lighting equipment in the conference room is divided into at least one group according to areas, and each group of lighting equipment has an independent lighting equipment group number. In addition, the control panel and the lighting equipment are provided with wireless control modules, a wireless ad hoc network can be established between the wireless control modules, and the control panel can control the lighting equipment in the conference room through the established wireless ad hoc network. More specifically, the control panel can also preset at least one working mode and a corresponding lighting equipment group number, and generate a worksheet to store at the control panel in which the working mode has a one-to-one correspondence with the lighting equipment group number. Further, the control panel queries the worksheet stored at the control panel according to lighting requirements of a user to determine a lighting equipment that the user requires to be enabled, and obtains a lighting equipment group number corresponding to the lighting equipment required to be enabled. Accordingly, the control panel broadcasts a wireless control command carrying the lighting equipment group number corresponding to the lighting equipment required to be enabled to the lighting equipment through the wireless ad hoc network between the wireless control modules, the lighting equipment receives and forwards the wireless control command, and performs a corresponding operation according to the wireless control command.

It can be known that in the method of the example of the present disclosure, the control panel controls the lighting equipment in the conference room through the wireless ad hoc network between the modules. This method does not need to configure multiple switches for multiple equipment and does not need to establish complex hardware circuits. The user can adjust the switch, brightness, color temperature, etc. of the lighting equipment of the conference room at any position in the conference room through only the control panel, which is convenient for the user. In addition, this method can establish a connection with the network through a wireless networking technology, which is powerful and widely used. In addition, each lighting equipment group can also be arbitrarily configured and combined, thereby realizing the custom configuration and interchange of the system in the true sense, and intelligently realizing the separation and combination of lighting in several conference room space areas. In addition, the present disclosure can also simply and quickly set different lighting scenes for different conference areas through the control panel according to the requirements of users to adapt to different lighting effects of different conference states, and each conference area is independently controlled, which improve the efficiency of the use of the conference room while reducing the management work of lighting switching of the conference room, thereby improving the user experience.

The above description is only an overview of the technical solution of the present disclosure. In order to better understand the technical means of the present disclosure to be implemented in accordance with the contents of the description, and in order to make the above and other objects, features, and advantages of the present disclosure more comprehensible, examples of the present disclosure are enumerated below.

Based on the following detailed description of examples of the present disclosure with reference to the accompanying drawings, those skilled in the art will more clearly understand the foregoing and other objects, advantages, and features of the present disclosure.

In the description provided here, numerous specific details are explained. It should be understood, however, that examples of the disclosure may be practiced without these specific details. In some instances, well-known methods, structures, and techniques have not been illustrated in detail so as not to obscure the understanding of the specification.

Similarly, it should be understood that, in order to simplify the disclosure and help understand one or more of the various aspects of the disclosure, in the above description of examples of the disclosure, various features of the disclosure are sometimes grouped together into a single example, figure, or description of it. However, this disclosed method should not be construed as reflecting the intention that the claimed disclosure requires more features than are expressly recited in each claim. More precisely, as reflected by the following claims, the aspect of the disclosure is less than all features of the single example previously disclosed.

Those skilled in the art can understand that the modules in the device in the example can be adaptively changed and set in one or more devices different from the example. The modules or units or components in the example may be combined into one module or unit or component, and furthermore, they may be divided into a plurality of sub-modules or sub-units or sub-components. Except that at least some of such features and/or processes or units are mutually exclusive, all features disclosed in this specification (including the accompanying claims, abstract and drawings) and all processes or units of any method or device so disclosed may be combined by any combination. Each feature disclosed in this specification (including the accompanying claims, abstract, and drawings) may be replaced by alternative features serving the same, equivalent or similar purpose, unless expressly stated otherwise.

In addition, those skilled in the art can understand that although some examples herein include some features included in other examples rather than others, the combination of features of different examples is meant to be within the scope of the present disclosure and form different examples.

Examples of the various components of the present disclosure may be implemented in hardware, or in software modules running on one or more processors, or in a combination thereof. Those skilled in the art should understand that a microprocessor or a digital signal processor (DSP) may be used in practice to implement some or all functions of some or all components in the device according to the example of the present disclosure. The disclosure can also be implemented as a device or device program (e.g., a computer program and a computer program product) for performing part or all of the method described herein. Such a program that implements the present disclosure may be stored on a computer-readable medium or may have the form of one or more signals. Such signals can be downloaded from an Internet website, provided on a carrier signal, or provided in any other form.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

It should be noted that the above-mentioned examples illustrate rather than limit the disclosure, and that those skilled in the art may design alternative examples without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The disclosure may be implemented by means of hardware comprising several distinct elements, and by means of a suitably programmed computer. In the unit claim listing several devices, several of these devices may be embodied by the same hardware item. The use of the words first, second, and third does not imply any order. These words can be interpreted as names.

At this point, those skilled in the art should realize that, although a number of examples of the present disclosure have been illustrated and described in detail herein, many other variations or modifications consistent with the principles of the present disclosure can be directly determined or derived from the disclosure of the present disclosure without departing from the spirit and scope of the disclosure. Therefore, the scope of the present disclosure should be understood and deemed to cover all these other variations or modifications.

What is claimed is:

1. A method for controlling partition lighting of a conference room based on a wireless networking technology, comprising:

controlling, by a control panel, a working state of lighting equipment in the conference room, wherein: the lighting equipment comprises a main light source, a background soft light, and a projection light, lighting parameters of each lighting equipment corresponding to different lighting scenes are stored in the lighting equipment, the lighting equipment in the conference room is divided into at least one group according to areas, each group of lighting equipment has an independent lighting equipment group number, the control panel and the lighting equipment are provided with wireless control modules, and a wireless ad hoc network is established between the wireless control modules;

presetting, by the control panel, at least one working mode and a corresponding lighting equipment group number, and generating and storing at the control panel a worksheet in which the working mode has a one-to-one correspondence with the lighting equipment group number;

querying, by the control panel, the worksheet stored at the control panel according to lighting requirements of a user to determine a lighting equipment that the user requires to be enabled, and obtaining a lighting equipment group number corresponding to the lighting equipment required to be enabled; and broadcasting, by the control panel, a wireless control command carrying the lighting equipment group number corresponding to the lighting equipment required to be enabled to the lighting equipment through the wireless ad hoc network between the wireless control modules, receiving and forwarding, by the lighting equipment, the wireless control command, and performing a corresponding operation according to the wireless control command by adjusting the lighting parameters of the lighting equipment to achieve different lighting scenes, wherein the lighting equipment comprises at least two nodes in the wireless ad hoc network and each of the two nodes is individually controlled and when one of the at least two nodes in the wireless ad hoc network is damaged, the other nodes in the wireless ad hoc network operate continuously such that an expansion of nodes of the lighting equipment is facilitated.

2. The method according to claim 1, wherein querying the worksheet comprises:
receiving, by the control panel, a control command triggered by the user, and obtaining a working mode corresponding to a currently controlled lighting equipment, wherein each lighting equipment stores a working mode most recently received; and
querying, by the control panel, the worksheet stored at the control panel according to the working mode corresponding to the currently controlled lighting equipment to determine the lighting equipment which the user requires to be enabled, and obtaining the lighting equipment group number corresponding to the lighting equipment required to be enabled.

3. The method according to claim 1, prior to querying the worksheet, further comprising: determining whether the control panel receives a mode switching command, and if so, obtaining, by the control panel, a switched working mode; and
broadcasting, by the control panel, the wireless control command carrying the switched working mode to each lighting equipment and each control panel in the conference room through the wireless ad hoc network between the wireless control modules, receiving and forwarding, by each lighting equipment and each control panel, the wireless control command, and updating the working mode locally stored in each lighting equipment and each control panel according to the wireless control command.

4. The method according to claim 1, wherein broadcasting the wireless control command comprises:
encoding, by the control panel, the lighting equipment group number corresponding to the lighting equipment required to be enabled according to a set encryption rule to generate a working group number in a specific format; and
broadcasting, by the control panel, the wireless control command carrying the working group number in the specific format to each lighting equipment through the wireless ad hoc network between the wireless control modules.

5. The method according to claim 1, further comprising:
presetting, by the control panel, at least one lighting scene;
selecting, by the control panel, a corresponding lighting scene according to a requirement of the user; and
transmitting, by the control panel, the wireless control command to the lighting equipment corresponding to the current lighting equipment group number through the wireless ad hoc network between the wireless control modules to control the lighting state of the lighting equipment, wherein the wireless control command carries the lighting scene selected by the user.

6. The method according to claim 5, further comprising:
selecting, by the control panel, a lighting equipment with a strongest RSSI intensity among the lighting equipment corresponding to the current lighting equipment group number through the wireless ad hoc network, and establishing a connection;
obtaining, by the control panel, a target lighting parameter and an actual lighting parameter of the connected lighting equipment;
calculating, by the control panel, a correction coefficient of the actual lighting parameter according to the target lighting parameter; and
adjusting, by the control panel, a lighting parameter of the connected lighting equipment according to the correction coefficient, and controlling the connected lighting equipment to perform lighting, according to the adjusted lighting parameters.

7. The method according to claim 6, further comprising:
transmitting, by the control panel, the correction coefficient to all lighting equipment corresponding to the current lighting equipment group number; and
adjusting lighting parameters of all the lighting equipment corresponding to the current lighting equipment group number according to the correction coefficient, and controlling all the lighting equipment corresponding to the current lighting equipment group number to perform lighting according to the adjusted lighting parameters.

8. The method according to claim 6, further comprising:
setting, by a timer of the control panel, different timing times for different scene modes of the conference room; and switching automatically to a next preset scene mode in response to that timing time of current scene mode of the conference room is reached.

9. A device for controlling partition lighting of a conference room based on a wireless networking technology, wherein:
the device is applied to a control panel which controls a working state of lighting equipment in the conference room, the lighting equipment comprises a main light source, a background soft light, and a projection light, lighting parameters of each lighting equipment corresponding to different lighting scenes are stored in the lighting equipment, the lighting equipment in the conference room is divided into at least one group according to area, each group of lighting equipment has an independent lighting equipment group number, the control panel and the lighting equipment are provided with wireless control modules, and a wireless ad hoc network is established between the wireless control modules, and wherein the device comprises:
a mode presetting module, configured to preset, by the control panel, at least one working mode and a corresponding lighting equipment group number, and generate and store at the control panel a worksheet in which the working mode has a one-to-one correspondence with the lighting equipment group number;
a selection obtaining module, configured to query, by the control panel, the worksheet stored at the control panel according to a lighting requirement of a user to determine a lighting equipment that the user requires to be enabled, and obtain a lighting equipment group number corresponding to the lighting equipment required to be enabled; and a first wireless control module, configured to broadcast, by the control panel, a wireless control command carrying the lighting equipment group number corresponding to the lighting equipment required to be enabled to the lighting equipment through the wireless ad hoc network between the wireless control modules, receive and forward, by the lighting equipment, the wireless control command, and perform a corresponding operation according to the wireless control command by adjusting the lighting parameters of the lighting equipment to achieve different lighting scenes, wherein the lighting equipment comprises at least two nodes in the wireless ad hoc network and each of the two nodes is individually controlled and when one of the at least two nodes in the wireless ad hoc network is damaged, the other nodes in the wireless ad hoc network operate continuously such that an expansion of nodes of the lighting equipment is facilitated.

10. The device according to claim 9, wherein the selection obtaining module is further configured to:
receive, by the control panel, a control command triggered by a user, and obtain a working mode corresponding to a currently controlled lighting equipment, wherein each lighting equipment stores a working mode most recently received; and
query, by the control panel, the worksheet stored at the control panel according to the working mode corresponding to the currently controlled lighting equipment to determine the lighting equipment which the user requires to be enabled, and obtain the lighting equipment group number corresponding to the lighting equipment required to be enabled.

11. The device according to claim 9, further comprising:
a switching determining module, configured to:
determine whether the control panel receives a mode switching command, and if so, obtain, by the control panel, a switched working mode; and
broadcast, by the control panel, a wireless control command carrying the switched working mode to each lighting equipment and each control panel in the conference room through the wireless ad hoc network between the wireless control modules, receive and forward, by each lighting equipment and each control panel, the wireless control command, and update the working mode locally stored in each lighting equipment and each control panel according to the wireless control command.

12. The device according to claim 9, wherein the first wireless control module is further configured to:
encode, by the control panel, the lighting equipment group number corresponding to the lighting equipment required to be enabled according to a set encryption rule to generate a working group number in a specific format; and
broadcast, by the control panel, a wireless control command carrying the working group number in the specific format to each lighting equipment through the wireless ad hoc network between the wireless control modules.

13. The device according to claim 9, further comprising:
a scene presetting module, configured to preset, by the control panel, at least one lighting scene; and
a scene selection module, configured to select, by the control panel, a corresponding lighting scene according to a requirement of the user; and
wherein the first wireless control module is further configured to transmit, by the control panel, a wireless control command to the lighting equipment corresponding to the current lighting equipment group number through the wireless ad hoc network between the wireless control modules to control the lighting state of the lighting equipment, wherein the wireless control command carries a lighting scene selected by the user.

14. The device according to claim 13, wherein:
the first wireless control module is further configured to:
select, by the control panel, a lighting equipment with a strongest RSSI intensity among the lighting equipment corresponding to the current lighting equipment group number through the wireless ad hoc network, and establish a connection; and
obtain, by the control panel, a target lighting parameter and an actual lighting parameter of the connected lighting equipment; and
the device further comprises:
a scene detection module that is configured to:
calculate, by the control panel, a correction coefficient of the actual lighting parameter according to the target lighting parameter; and
adjust, by the control panel, a lighting parameter of the connected lighting equipment according to the correction coefficient, and control the connected lighting equipment to perform lighting according to the adjusted lighting parameter.

15. The device according to claim 14, further comprising:
a scene correction module that is configured to:
transmit, by the control panel, the correction coefficient to all lighting equipment corresponding to the current lighting equipment group number; and
adjust lighting parameters of all the lighting equipment corresponding to the current lighting equipment group number according to the correction coefficient, and control all the lighting equipment corresponding to the current lighting equipment group number to perform lighting according to the adjusted lighting parameters.

16. The device according to claim 14, further comprising:
a scene timing switching module that is configured to:
set, by a timer of the control panel, different timing times for different scene modes of the conference room; and
switch automatically to a next preset scene mode in response to that timing time of current scene mode of the conference room is reached.

17. A device for controlling partition lighting of a conference room based on a wireless networking technology, wherein the device is applied to a lighting equipment which receives and forwards control signals of a control panel, the control panel and the lighting equipment are provided with wireless control modules, and a wireless ad hoc network is established between the wireless control modules, and wherein the device comprises:
a second wireless control module, configured to receive, by the lighting equipment, a wireless control command broadcast by the control panel through the wireless ad hoc network between the wireless control modules, wherein the lighting equipment comprises a main light source, a background soft light, and a projection light, and lighting parameters of each lighting equipment corresponding to different lighting scenes are stored in the lighting equipment;
a determining module, configured to obtain, by the lighting equipment and according to the wireless control command, a lighting equipment group number corresponding to the lighting equipment required to be enabled which is carried in the wireless control command; and a response module, configured to determine, by the lighting equipment, whether itself needs to respond to the wireless control command according to the lighting equipment group number corresponding to the lighting equipment required to be enabled, if so, perform and forward by the lighting equipment the wireless control command by adjusting the lighting parameters of the lighting equipment to achieve different lighting scenes, and if not, forward by the lighting equipment the wireless control command, wherein the lighting equipment comprises at least two nodes in the wireless ad hoc network and each of the two nodes is individually controlled and when one of the at least two nodes in the wireless ad hoc network is damaged, the other nodes in the wireless ad hoc network operate continuously such that an expansion of nodes of the lighting equipment is facilitated.

18. The device according to claim 17, wherein the response module is further configured to:
  decode, by the lighting equipment, a lighting equipment group number in a specific format corresponding to the lighting equipment required to be enabled according to a set decryption rule to obtain each decoded independent lighting equipment group numbers; and
  determine, by the lighting equipment, whether itself needs to respond to the wireless control command according to each decoded independent lighting equipment group number.

19. The device according to claim 17, further comprising:
a scene configuration module configured to preset, by the lighting equipment, a lighting parameter matching a lighting scene of the control panel; and
wherein the second wireless control module is further configured to receive and forward, by the lighting equipment, a wireless control command transmitted by the control panel, wherein the wireless control command carries a lighting scene selected by the user; and
the device further comprises a lighting module configured to perform, by the lighting equipment, lighting according to the lighting parameter corresponding to the lighting scene selected by the user.

\* \* \* \* \*